US012612750B2

(12) United States Patent
Schluessel et al.

(10) Patent No.: US 12,612,750 B2
(45) Date of Patent: Apr. 28, 2026

(54) ARTICULATING PUSHER SHOVEL

(71) Applicant: George Schluessel, Edmonton (CA)

(72) Inventors: George Schluessel, Edmonton (CA); Martin Dalgaard, Topanga, CA (US)

(73) Assignee: George Schluessel, Edmonton (CA)

(*) Notice: Subject to any disclaimer, the term of this patent is extended or adjusted under 35 U.S.C. 154(b) by 0 days.

(21) Appl. No.: 19/251,672

(22) Filed: Jun. 26, 2025

(65) Prior Publication Data

US 2025/0320675 A1 Oct. 16, 2025

Related U.S. Application Data

(63) Continuation-in-part of application No. 18/412,521, filed on Jan. 13, 2024, now abandoned.

(51) Int. Cl.

| | |
|---|---|
| ***E01H 5/02*** | (2006.01) |
| ***A01B 1/22*** | (2006.01) |
| ***E01H 5/06*** | (2006.01) |
| ***F21V 33/00*** | (2006.01) |

(52) U.S. Cl.
CPC ............ *E01H 5/066* (2013.01); *E01H 5/061* (2013.01); *F21V 33/0084* (2013.01)

(58) Field of Classification Search
CPC ........... A01B 1/22; A01B 1/222; A01B 1/225; E01H 5/02
USPC ........................................ 294/53.5, 54.5, 56
See application file for complete search history.

(56) References Cited

U.S. PATENT DOCUMENTS

| | | | | |
|---|---|---|---|---|
| 841,848 | A | 1/1907 | Conner | |
| 881,782 | A | 3/1908 | Elliott | |
| 3,115,359 | A | 12/1963 | Hendrick | |
| 3,473,838 | A | 10/1969 | Rankin | |
| 3,483,643 | A | 12/1969 | Wenzel | |
| 4,597,204 | A | 7/1986 | Heiden | |
| 5,669,163 | A | 9/1997 | Winter | |
| 5,984,393 | A | 11/1999 | Washington | |
| 6,457,757 | B2 | 10/2002 | Hendrick | |
| 7,305,779 | B1 | 12/2007 | Purvis | |
| 9,771,698 | B2 * | 9/2017 | Khan | E01H 5/061 |
| 10,542,653 | B1 * | 1/2020 | Liversedge | H05B 3/48 |
| 11,523,616 | B2 * | 12/2022 | Mecsaci | A21B 3/003 |
| 11,700,780 | B2 * | 7/2023 | Junkin | A01B 1/10 172/373 |

(Continued)

FOREIGN PATENT DOCUMENTS

| | | | |
|---|---|---|---|
| CA | 2545744 | A1 | 11/2006 |
| CN | 108012587 | A | 5/2018 |

(Continued)

OTHER PUBLICATIONS

US 2006/0249964 A1, Brazeau, November 9 (Year: 2006).*

(Continued)

*Primary Examiner* — Douglas A Hess
(74) *Attorney, Agent, or Firm* — Womble Bond Dickinson (US) LLP

(57) ABSTRACT

According to the present disclosure, a pusher shovel may include a head, an atlas attached to the head, a shaft rotatably coupled to the atlas, a handle rotatably coupled to the shaft, and a twist mechanism configured to cause the head to rotate relative to the shaft in response to rotation of the handle.

19 Claims, 31 Drawing Sheets

(56) References Cited

U.S. PATENT DOCUMENTS

| | | | | |
|---|---|---|---|---|
| 11,780,073 | B2 * | 10/2023 | Hurt | A01B 1/026 16/430 |
| 12,392,099 | B1 | 8/2025 | Schluessel | |
| 2008/0185857 | A1 | 8/2008 | Westgarde | |
| 2013/0119684 | A1 | 5/2013 | Ceja | |

FOREIGN PATENT DOCUMENTS

| | | | |
|---|---|---|---|
| CN | 109518894 | A | 3/2019 |
| CN | 217644166 | U | 10/2022 |

OTHER PUBLICATIONS

US 2007/0145757 A1, Wu, Jun. 28 (Year: 2007).*
Extended European Search Report for corresponding European Application No. 25188270.0, dated Dec. 22, 2025 (12 pages).

* cited by examiner

ARTICULATING PUSHER SHOVEL

CROSS-REFERENCE TO RELATED APPLICATION

This application is a continuation-in-part of U.S. patent application Ser. No. 18/412,521, filed Jan. 13, 2024, the entire content of which is incorporated herein by reference.

FIELD

The present disclosure relates in general to shovels and also relates to articulating pusher shovels.

BACKGROUND

Conventional shovels have been utilized for generations as fundamental tools for digging, lifting, and moving materials. Traditional shovel designs typically comprise a blade or scoop attached to a handle, facilitating the manual transfer of materials from one location to another. While traditional shovel designs have proven effective in many applications, they often present challenges related to user fatigue, inefficient handling of materials, and limitations in adaptability to different types of materials.

Existing attempts to address these challenges have led to the development of ergonomic handles, lightweight materials, and variations in shovel blade shapes. However, there remains a desire for an innovative shovel design that not only enhances ergonomic considerations but also provides improved maneuverability, durability, and adaptability to diverse snow conditions.

Major shortcomings in the shovel art present themselves when pushing materials with the intention of clearing a pathway through such materials. Sand, mud, or snow, for example, can build up on a pathway and impede or prevent its use. Such materials must then be cleared so that a user can traverse the pathway. One issue that arises when such a task is undertaken is that the material being cleared overflows the shovel head to create a ridge of such material in the wake of the user's path, which then must be cleared again.

Another issue known in the shovel art is that the repetitive action of pushing, lifting, and tossing material causes excessive user fatigue. While pushing a shovel alone may not present an extreme activity, the act of breaking through built-up material and then lifting and tossing such material can present an undesirable amount of strain on a user's back, shoulders, and core.

Thus, there is a desire in the art for an overflow resistant articulating pusher shovel that may allow a user to clear material while reducing or preventing overflow from the shovel head and while reducing the lifting strain placed upon the user.

This Background section is provided only for purposes of introducing certain background material relating to the present disclosure and, thus, is not an admission of prior art, and may include information that is not part of the prior art.

SUMMARY

This Summary section introduces some features of non-limiting and non-exhaustive examples of the present disclosure, and is not intended to limit the scope of the claims.

According to an aspect, embodiments of the present disclosure relate to a pusher shovel, including a head, an atlas attached to the head and including a first gear, a shaft coupled to the atlas, a handle that is rotatable relative to the shaft, and a driveshaft installed within the shaft, and coupled to the handle and to the first gear such that rotation of the handle causes the head to rotate relative to the shaft.

In some examples, the shovel further includes a plurality of gears including the first gear, wherein the driveshaft interfaces with the plurality of gears such that the rotation of the handle causes the plurality of gears to turn.

In some examples, the shaft has a proximal end, coupled to the atlas, and a distal end coupled to the handle.

According to another aspect, embodiments of the present disclosure relate to a pusher shovel, including a head; an atlas attached to the head; a shaft rotatably coupled to the atlas; a handle rotatably coupled to the shaft; and a twist mechanism configured to cause the head to rotate relative to the shaft in response to rotation of the handle.

In some examples, the twist mechanism includes a driveshaft installed in the shaft and coupled between the handle and the atlas.

In some examples, the twist mechanism further includes a plurality of gears coupled to the driveshaft and configured to turn in response to the rotation of the handle.

In some examples, the plurality of gears includes a first gear, rotatable about a first axis, and a second gear rotatable about a second axis that is non-parallel to the first axis.

In some examples, the first gear is fixedly attached to the atlas, and the second gear is coupled between the first gear and the driveshaft.

In some examples, the second axis forms an obtuse angle relative to the first axis.

In some examples, the head has an elongated shape along a head axis, and the first axis is substantially perpendicular to the head axis.

In some examples, the shaft extends along a shaft axis, the head has an elongated shape along a head axis, and an angle between the head axis and the shaft axis is adjustable via the twist mechanism.

In some examples, the head includes a rectangular shovel head having a semi-lunar cross-section perpendicular to the head axis.

In some examples, the head is elongated between a first side end and a second side end along a head axis configured to be substantially parallel to a ground plane.

In some examples, the shaft is coupled to the atlas at a proximal end, and the rotation of the head relative to the shaft causes a first distance and a second distance, respectively between a distal end of the shaft and the first side end and between the distal end of the shaft and the second side end, to change.

In some examples, the rotation of the head causes one of the first distance or the second distance to increase while the other one of the first distance or the second distance decreases.

In some examples, the articulating pusher shovel includes a light-emitting element configured to be coupled to the shaft.

In some examples, the light-emitting element is configured to be detachably coupled to a housing fixed to the shaft.

In some examples, the housing is adjacent to a proximal end of the shaft coupled to the atlas, and the light-emitting element is configured to couple to the housing via a dovetail coupling mechanism, whereby a dovetail piece, on one of the light-emitting element and the housing, is configured to engage with a dovetail slot in the other one of the light-emitting element and the housing.

In some examples, the housing has first and second bumper stops respectively configured to abut against the head or the atlas when the head rotates to first or second angular positions.

In some examples, the light-emitting element includes a light-emitting diode (LED).

BRIEF DESCRIPTION OF THE DRAWINGS

The drawings, together with the specification, illustrate nonlimiting and non-exhaustive examples of the present disclosure. Elements in the figures may not be drawn to scale in order to enhance their clarity and improve understanding of various elements and embodiments of the present disclosure. Elements that are known to be common and well understood to those in the industry may not be depicted in order to provide a clear view of the various embodiments of the present disclosure.

DETAILED DESCRIPTION

Figure 1:
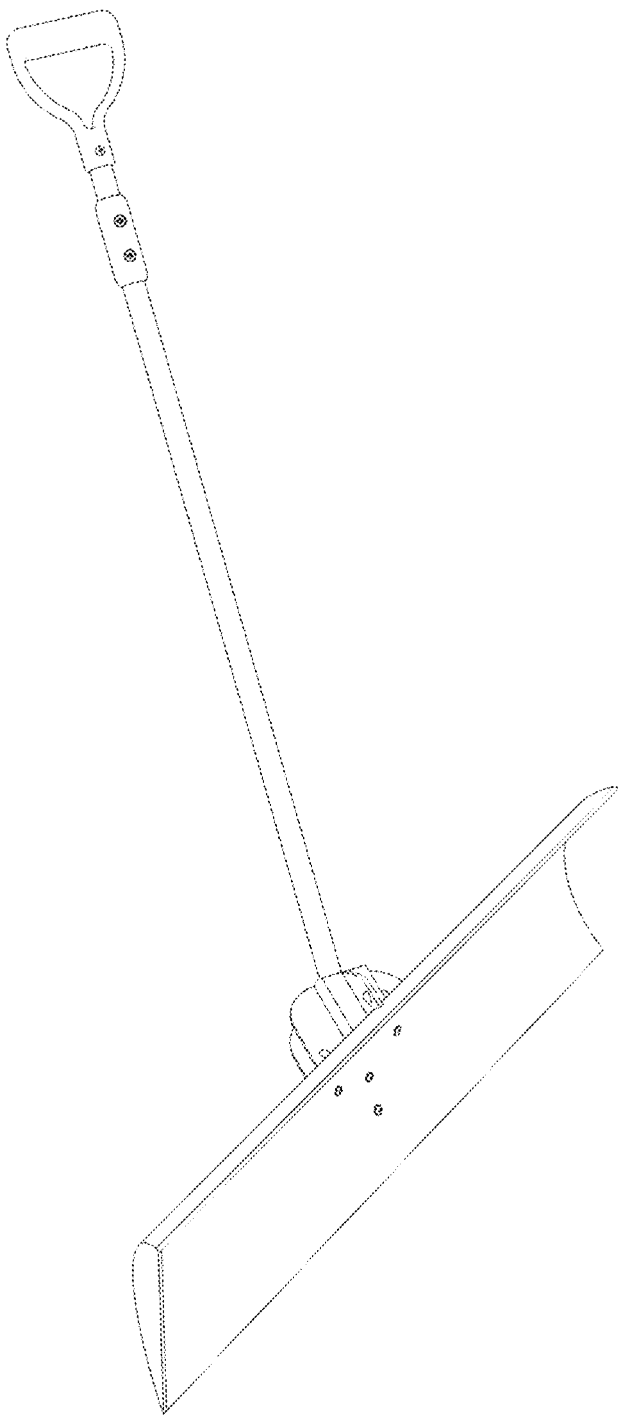
FIG. 1 is a front isometric perspective view of an overflow resistant articulating pusher shovel, according to some examples.
Figure 2:
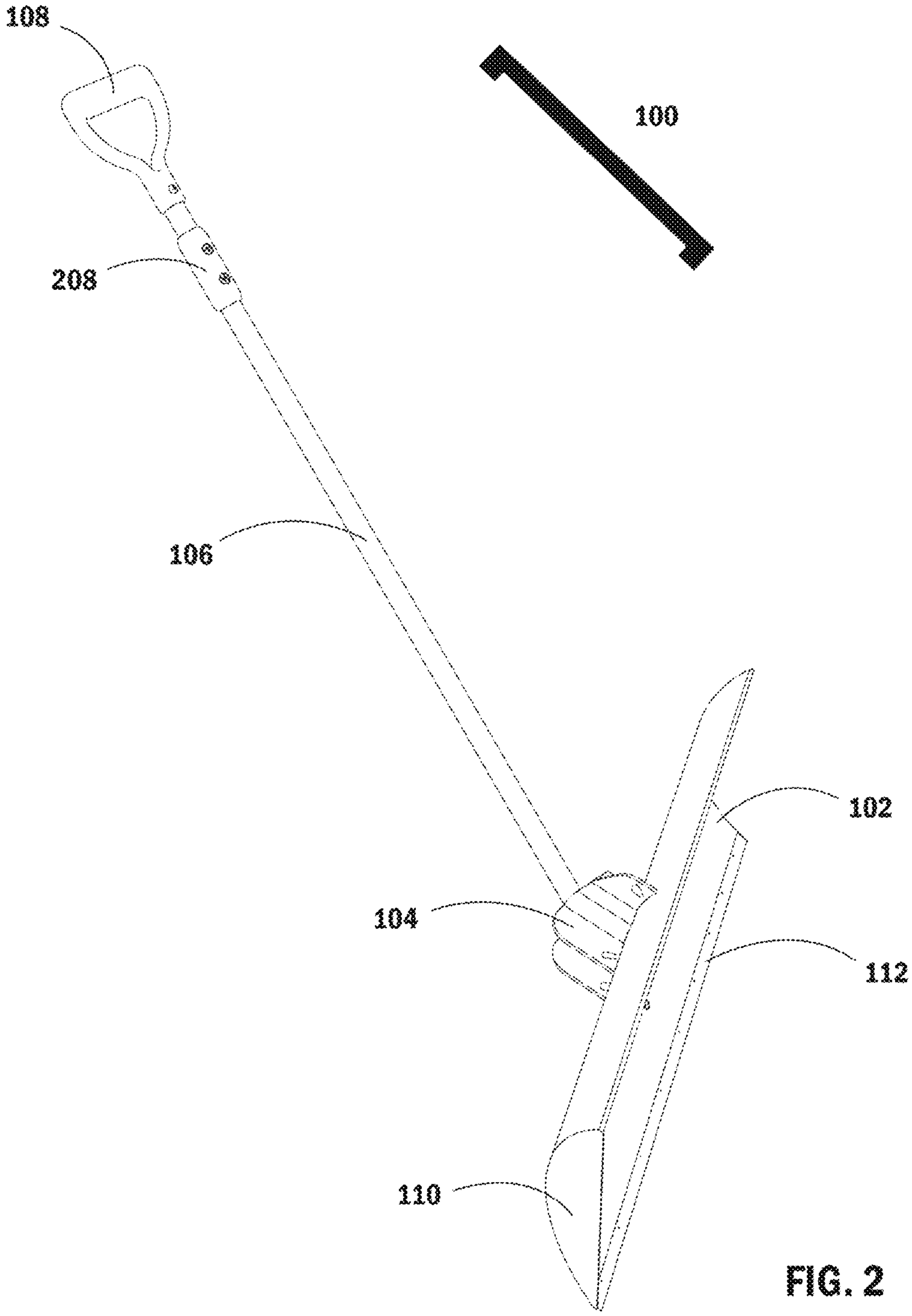
FIG. 2 is a front isometric perspective view of an overflow resistant articulating pusher shovel, according to some examples.
Figure 3:
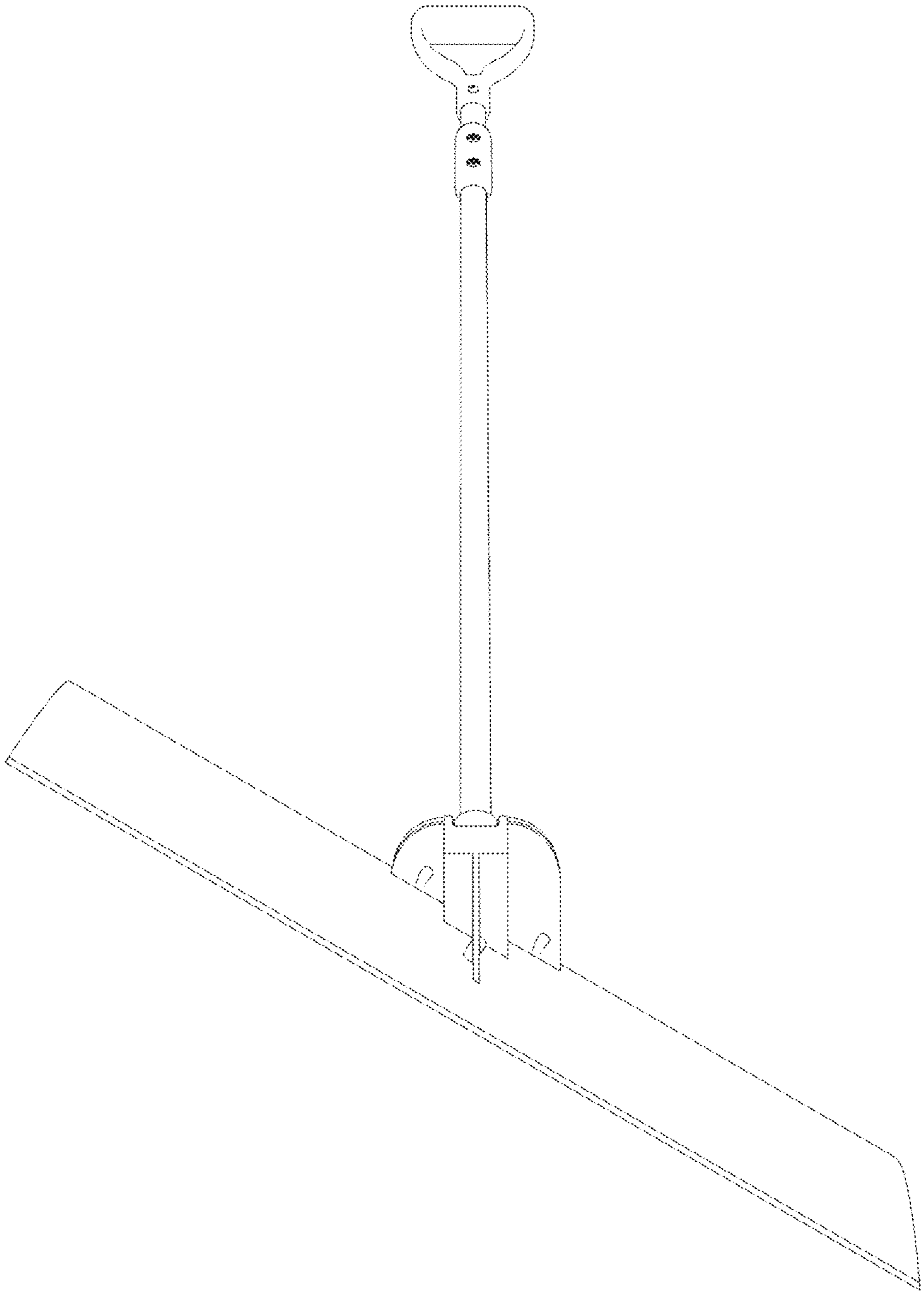
FIG. 3 is a top elevation view of an overflow resistant articulating pusher shovel, according to some examples.
Figure 4:
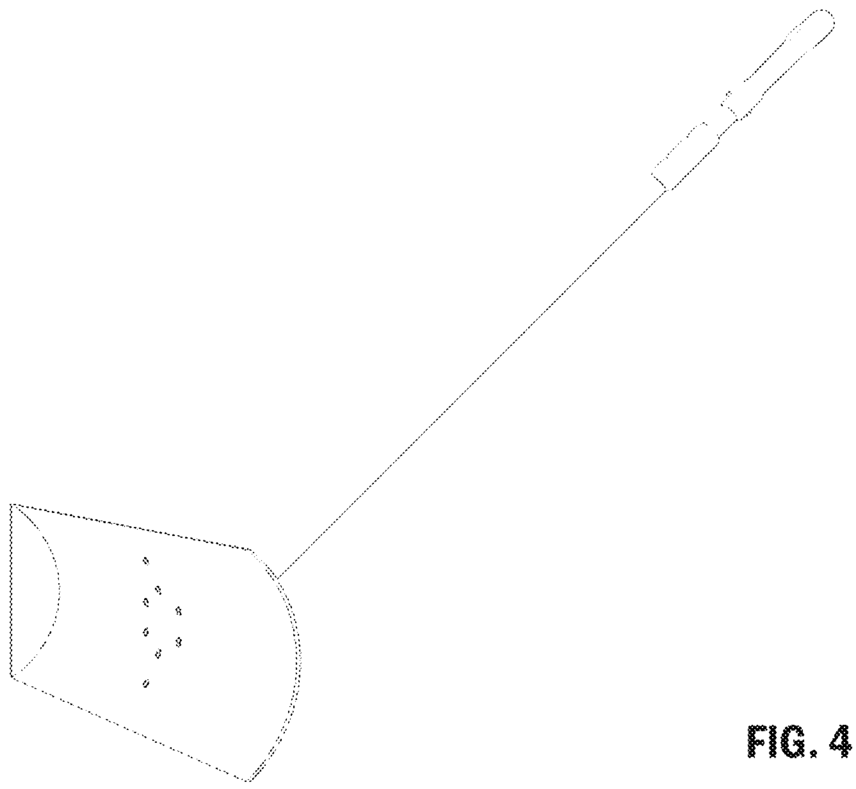
FIG. 4 is a left side elevation view of an overflow resistant articulating pusher shovel, according to some examples.
Figure 5:
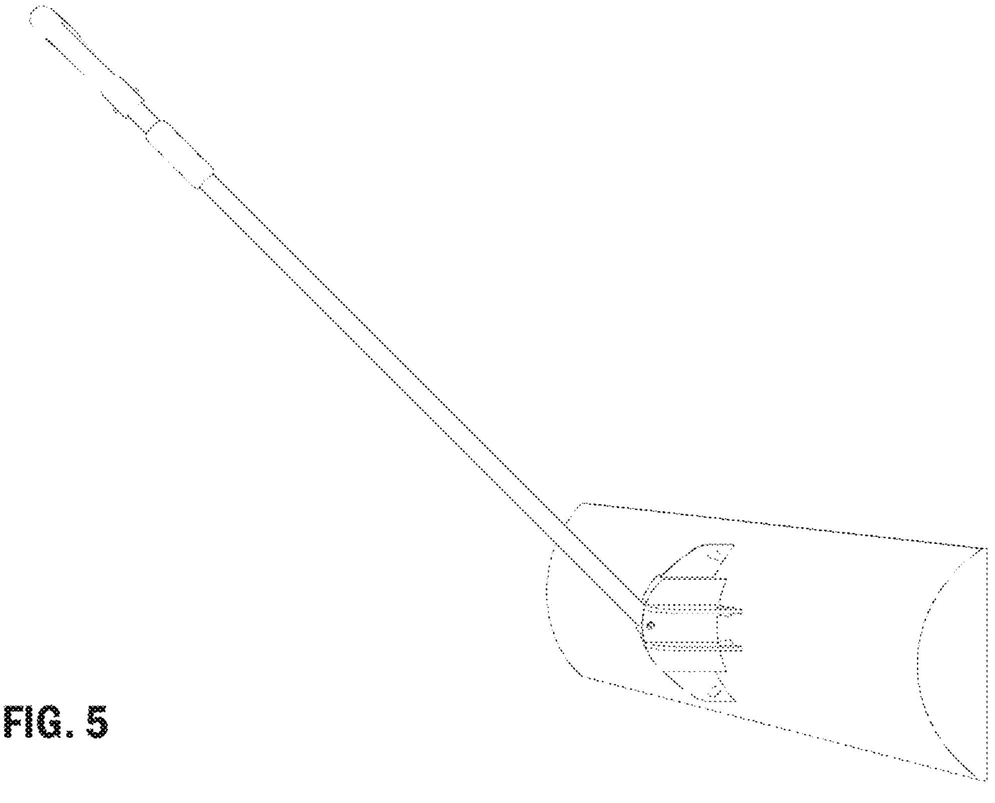
FIG. 5 is a right side elevation view of an overflow resistant articulating pusher shovel, according to some examples.
Figure 6:
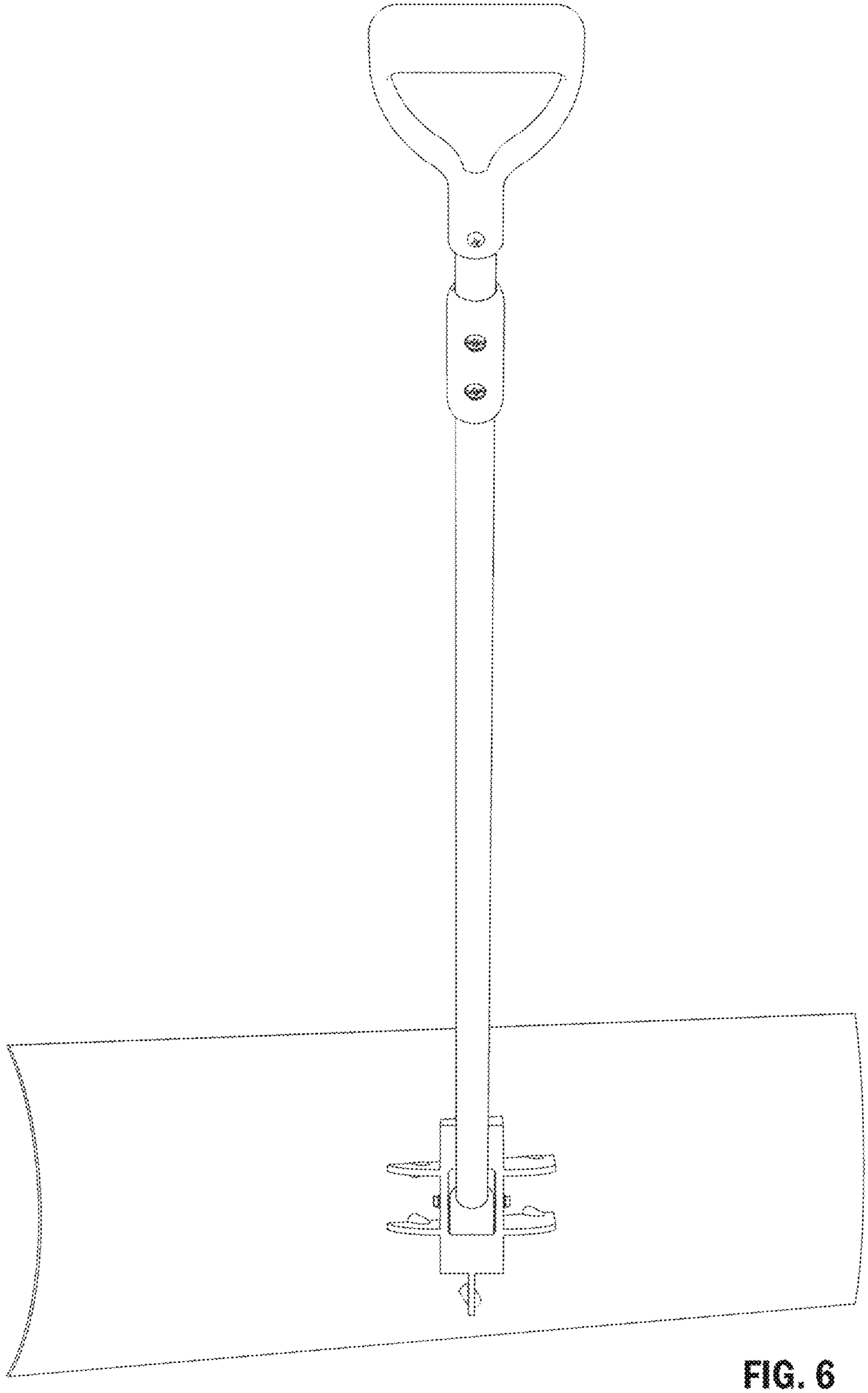
FIG. 6 is a rear elevation view of an overflow resistant articulating pusher shovel, according to some examples.
Figure 7:
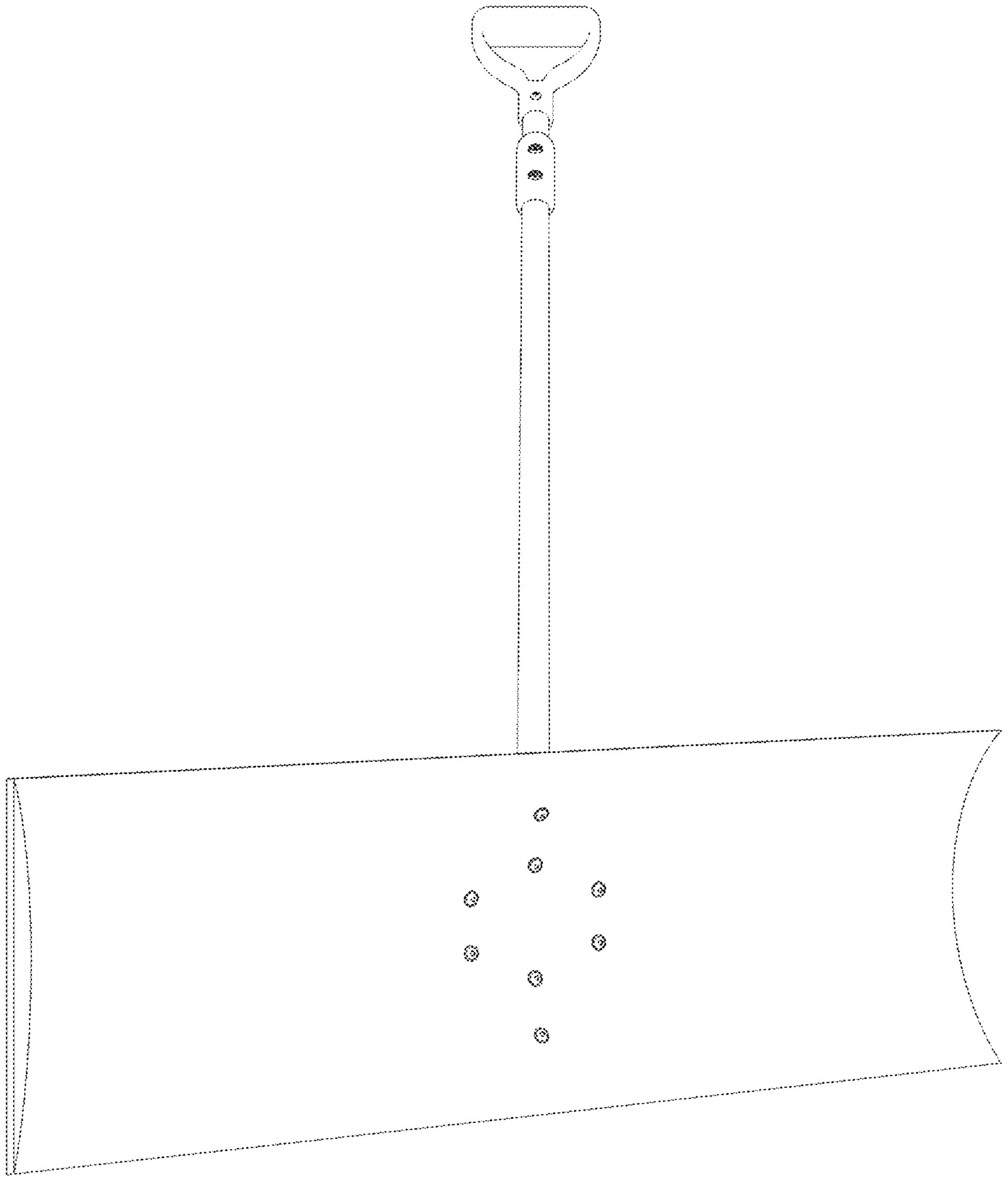
FIG. 7 is a front elevation view of an overflow resistant articulating pusher shovel, according to some examples.
Figure 8:
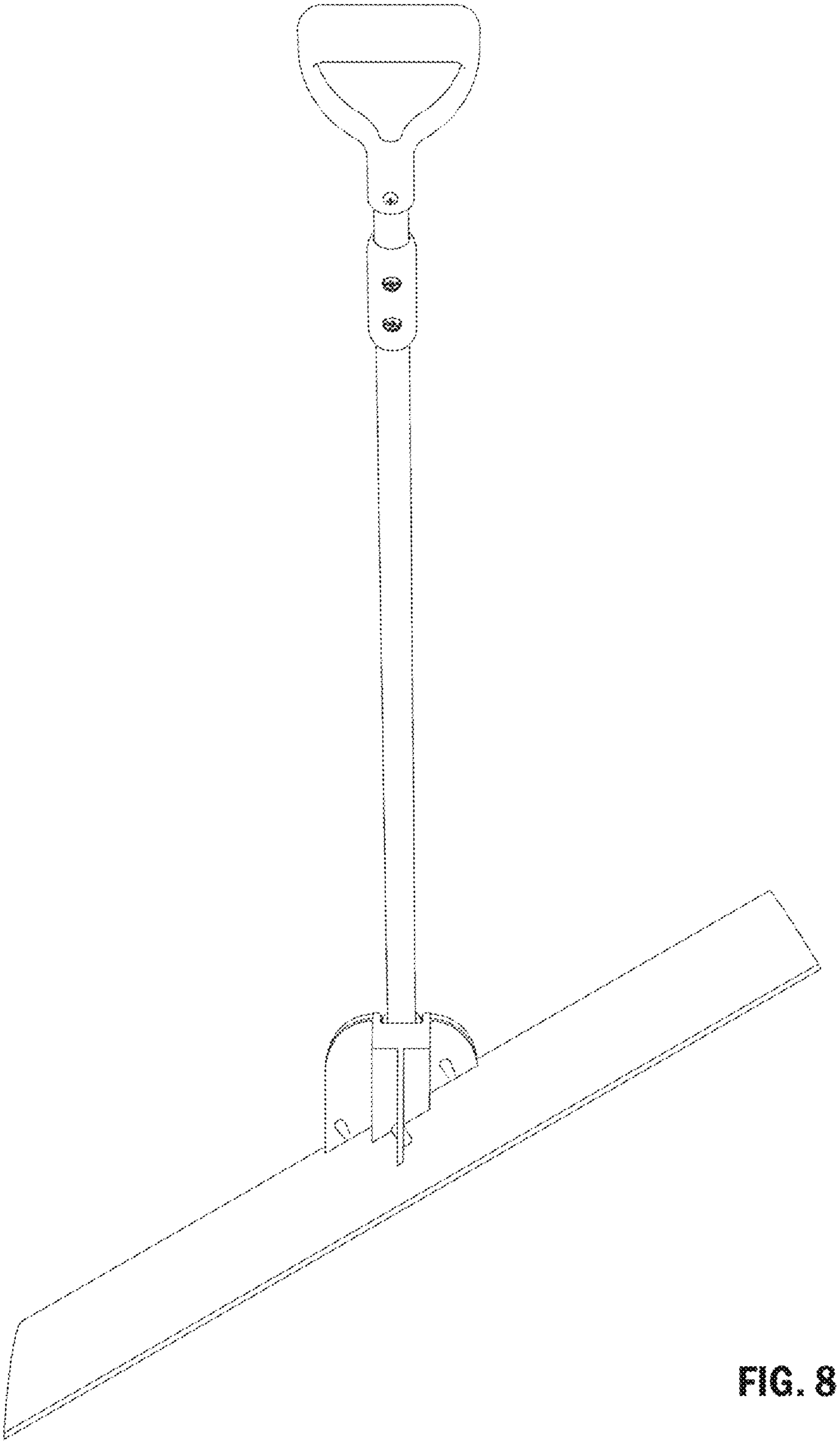
FIG. 8 is a bottom elevation view of an overflow resistant articulating pusher shovel, according to some examples.
Figure 9:
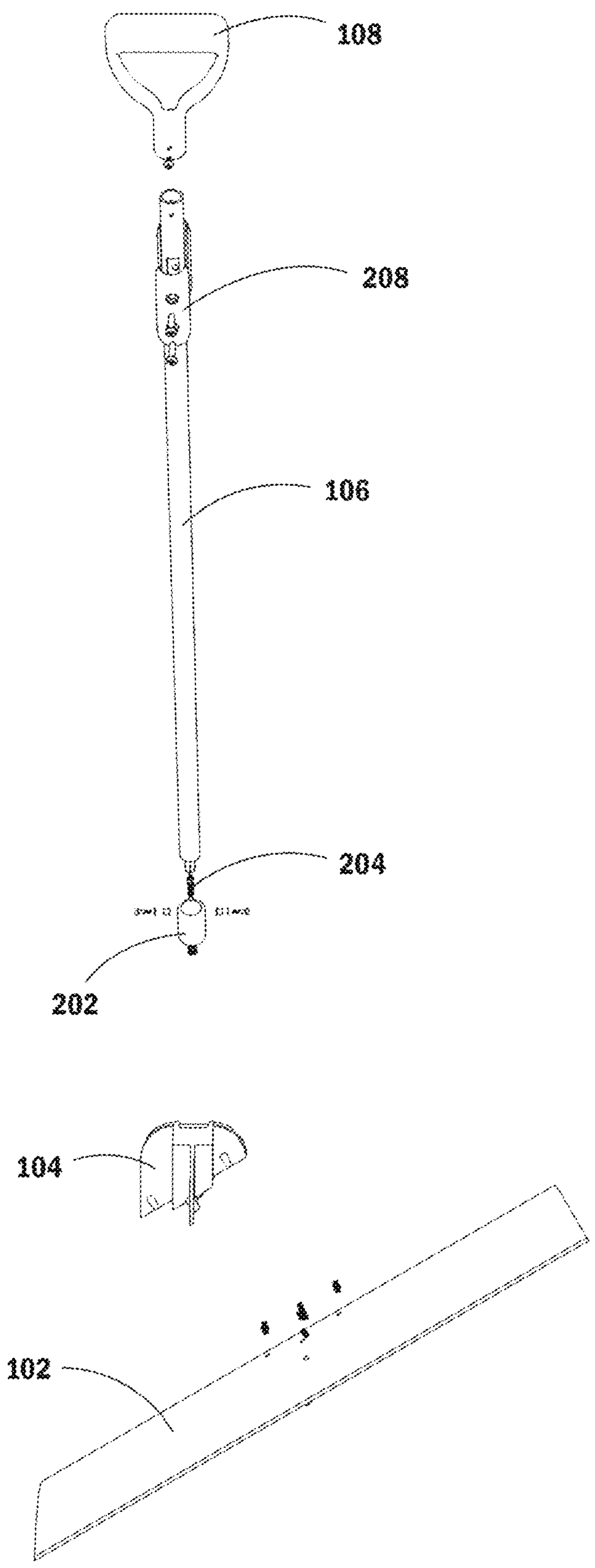
FIG. 9 is an exploded component view of an overflow resistant articulating pusher shovel, according to some examples.
Figure 10:
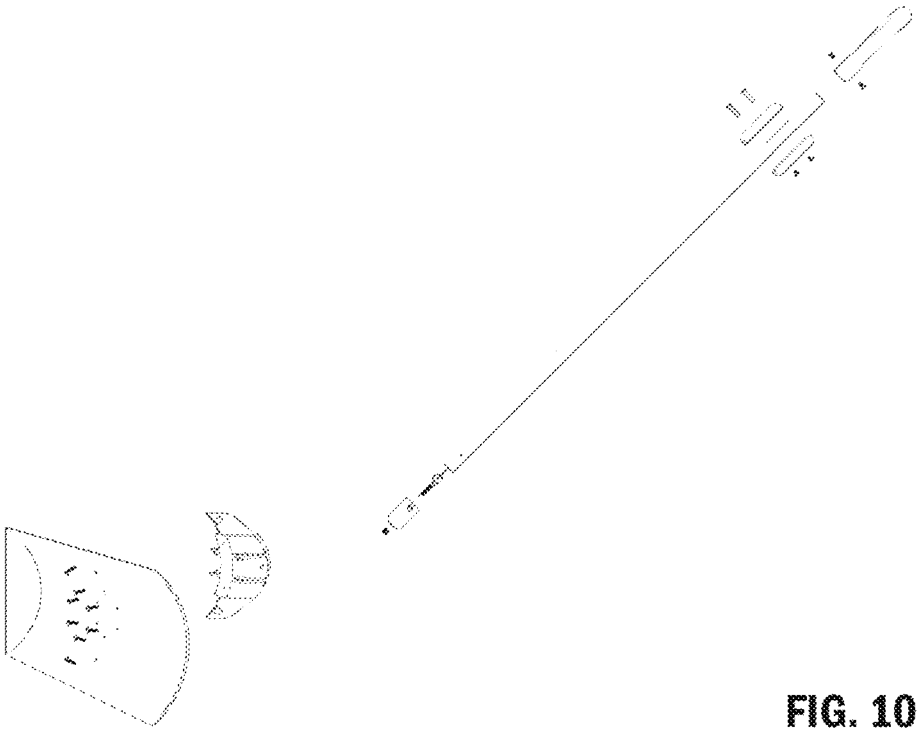
FIG. 10 is a left side exploded component view of an overflow resistant articulating pusher shovel, according to some examples.
Figure 11:
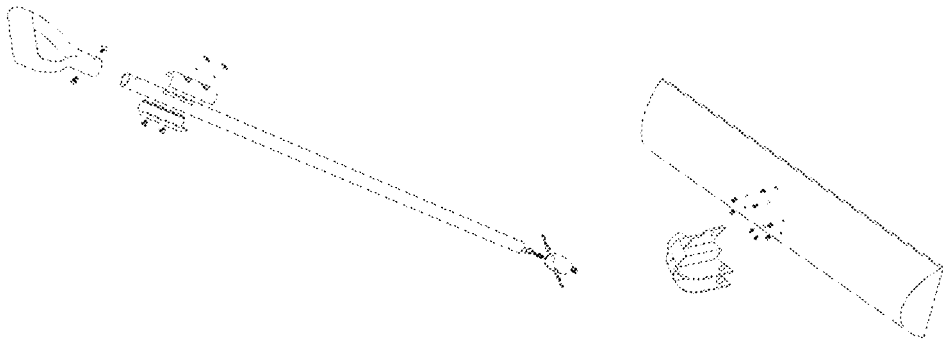
FIG. 11 is a right side exploded component view of an overflow resistant articulating pusher shovel, according to some examples.
Figure 12:
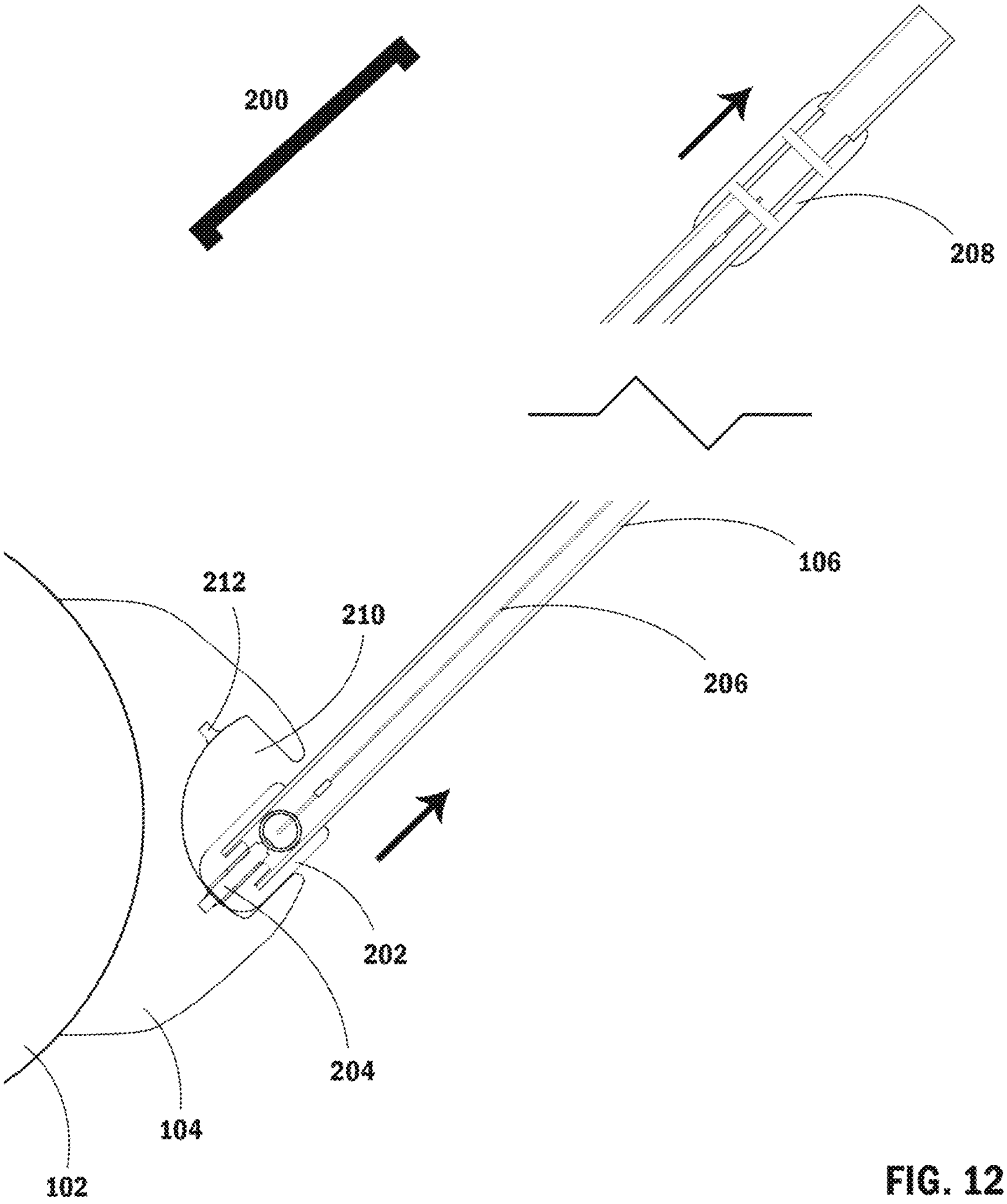
FIG. 12 is an exploded component view of an articulating mechanism of an overflow resistant articulating pusher shovel, according to some examples.

It will be understood that, although the terms “first,” “second,” “third,” etc., may be used herein to describe various elements, these elements should not be limited by these terms. These terms are only used to distinguish one element from another element. Thus, a first element discussed herein could be termed a second element without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The terminology used herein is for the purpose of describing particular embodiments only and is not intended to be limiting of the present disclosure. As used herein, the singular forms “a,” “an,” and “the” are intended to include the plural forms as well, unless the context clearly indicates otherwise. It will be further understood that the terms “comprises,” “comprising,” “includes,” and “including,” specify the presence of stated elements and/or other features, but do not preclude the presence or addition of one or more other elements and/or features. As used herein, the term “and/or” includes any and all combinations of one or more of the associated listed items. Expressions such as “at least one of,” when preceding a list of elements, modify the entire list of elements and do not modify the individual elements of the list. Further, the use of “may” when describing embodiments of the present disclosure refers to “one or more embodiments of the present disclosure.”

It will be understood that when an element is referred to as being “on,” “connected to,” “coupled to,” “attached to,” or “adjacent to” another element, it may be directly on, connected to, coupled to, attached to, or adjacent to the other element, or one or more intervening element(s) may be present. In contrast, when an element is referred to as being “directly on,” “directly connected to,” “directly coupled to,” “directly attached to,” or “immediately adjacent to” another element, there are no intervening elements present. Similar terms and phrases should be understood in a similar manner to encompass both direct and indirect affiliations between two or more elements being discussed. In addition, it will also be understood that when an element is referred to as being “between” two elements, it may be the only element between the elements, or one or more intervening elements may also be present.

As used herein, the phrase “at least part” includes part or all of the stated item, the phrase “at least partly” includes the stated item partly or entirely, and similar phrases should be interpreted in a similar manner.

As used herein, and unless otherwise defined, the term “substantially” and similar terms are used as terms of approximation and not as terms of degree, and are intended to account for the inherent deviations in measured or calculated values that would be recognized by those of ordinary skill in the art. Also, the term “about” and similar terms, when used herein in connection with a numerical value or a numerical range, are inclusive of the stated value and mean within an acceptable range of deviation for the particular value as determined by one of ordinary skill in the art, considering the measurement in question and the error associated with measurement of the particular quantity (e.g., the limitations of the measurement system). For example, “about” may mean within one or more standard deviations, or within ±30%, 20%, 10%, 5% of the stated value.

Any numerical range recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The overflow resistant articulating pusher shovel may allow a user to clear material while preventing overflow from the shovel head and reducing the lifting strain placed upon the user. To reduce or prevent material overflow from the shovel head the device may include a shovel head endplate and/or be rotatable in a side-to-side manner. To eliminate user lifting and straining under load the device may include an articulating head that allows a user to push materials in a desired direction instead of lifting that material. The overflow resistant articulating pusher shovel may further include a novel articulating mechanism for locking the shovel head into place but also allowing for the head to be articulated. Finally, the overflow resistant articulating pusher shovel may include other features, such as handles, shafts, and wear bars, so as to provide for additional ease of use and improved functionality.

The illustrations of FIGS. 1 to 13A illustrate an overflow resistant articulating pusher shovel, as contemplated by the present disclosure. The device may include, generally, a main body 100 and an articulating mechanism 200.

The main body 100 may include, generally, a head 102, an atlas 104, a shaft 106, and a handle 108. The head 102 may include any appropriate shovel head known in the art. In one or more embodiments, the head 102 may include a generally rectangular shovel head designed for pushing material and having a semilunar cross-section. The longer edges of the head 102 may be thinned into a sharp angle to allow for scraping, while the center section of the head 102 may be thicker to provide for structural rigidity. One short end of the head 102 may further include an end plate 110, which is a plate closing off the opening of a short end and for reducing or preventing overflow of material from the concavity of the head 102.

The handle 108 may include any appropriate handle allowing a user to control and manipulate the present device. The handle 108 may include, for example, a T-handle, a U-handle, or any other appropriate handle allowing for a user to push, pull, lift, turn, or otherwise manipulate the device.

The shaft 106 may include any appropriate shaft allowing for the extension of work/force applied by a user through the handle 108 over a desired distance. In one or more embodiments the shaft 106 may include a hollow cylinder or rod extending a desired length between the handle 108 and the head 102. The handle 108 may be attached to a distal end of the shaft 106.

The atlas 104 may include any appropriate mechanism for connecting the shaft 106 to the head 102. In one or more embodiments the atlas 104 may include a shaft receiver, which may include, or define, an opening into which the shaft 106 may be inserted and mechanically attached. The atlas 104 may be attached to a proximal end of the shaft 106. The atlas 104 may provide a transitional attachment by which work applied by a user into the handle 108 may be transferred from the shaft 106 to the head 102. In one or more embodiments the atlas 104 may offset the head 102 at an angle relative to the handle 108, so that force applied through the handle 108 causes the head 102 to push material to a side of the user.

The various components of the main body 100 may be attached to one another by any appropriate mechanism. By way of example, the various components of the main body 100 may be attached to each other by welding, bolting, screwing, inserting, melting, hooking, gluing, or otherwise adhering. In one or more embodiments a plurality of screws or bolts may be used to attach one component to another, as desired.

The articulating mechanism 200 may include, generally, a pivot 202, a locking pin 204, a cord 206, and a slide 208. The pivot 202 may include an end cap attached to the proximal end of the shaft 106 and having/defining an opening through its cap end. The atlas 104 may further include/define a pivot cavity 210 into which the pivot 202 fits. The pivot cavity 210 may include a semi-lunar cavity and the pivot 202 may articulate through a range of degrees within the pivot cavity 210.

The locking pin 204 may include a pin contained within the pivot 202 and extending distally outwards through the opening in the pivot 202 cap end. The locking pin 204 may further include a spring-loaded design so that it is pressed distally through the pivot 202 while being able to be retracted by a force pulling against it. The pivot cavity 210 may further include a plurality of pin receivers 212, which may include slots into which the projecting portion of the locking pin 204 may insert. By this design the locking pin 204 may insert into one of the plurality of pin receivers 212, and may lock the relative angle of the shaft 106 to the atlas 104.

The slide 208 may include any appropriate slide mechanism. In one or more embodiments the slide 208 may include a handle wrapping around the shaft 106 and passing through the center of the shaft 106. The shaft 106 may include/define a pair of slit openings through which the slide 208 is installed, and the slide 208 may be moveable through a limited range within these slit openings. In other embodiments the slide 208 may include a bolt-action design, a lever-action design, or any other appropriate mechanism for pulling.

The cord 206 may include any appropriate cord for providing a mechanical connection between the slide 208 and the locking pin 204. The cord 206 may include, for example, synthetic rope, cabling, braided line, metal rod, or any other appropriate material. The mechanical connection of the cord 206 between the slide 208 and the locking pin 204 may cause the locking pin 204 to be retracted into the pivot 202 when the slide 208 is manipulated by a user.

This retracting of the locking pin 204 into the pivot 202 may then allow the pivot 202 to move freely within the pivot cavity 210. In this way the user may change the relative angle of the shaft 106 to the atlas 104. The spring-loaded design on the locking pin 204 may then allow the locking pin 204 to advance into a different one of the plurality of pin receivers 212 and again lock the shaft 106 to the atlas 104 at a chosen angle.

The various components of the articulating mechanism 200 may be attached to one another by any appropriate mechanism. By way of example, the various components of the articulating mechanism 200 may be attached to each other by welding, bolting, screwing, inserting, melting, hooking, gluing, or otherwise adhering. In one or more embodiments a plurality of screws or bolts may be used to attach one component to another, as desired.

In one or more embodiments the head 102 may further include one or more wear bars 112, which may include any appropriate blade reinforcement or extension. The wear bar(s) 112 may be designed to wear down with use while protecting the head 102 from wear, and may include a replaceable component so that they may be replaced as desired.

Figure 13:
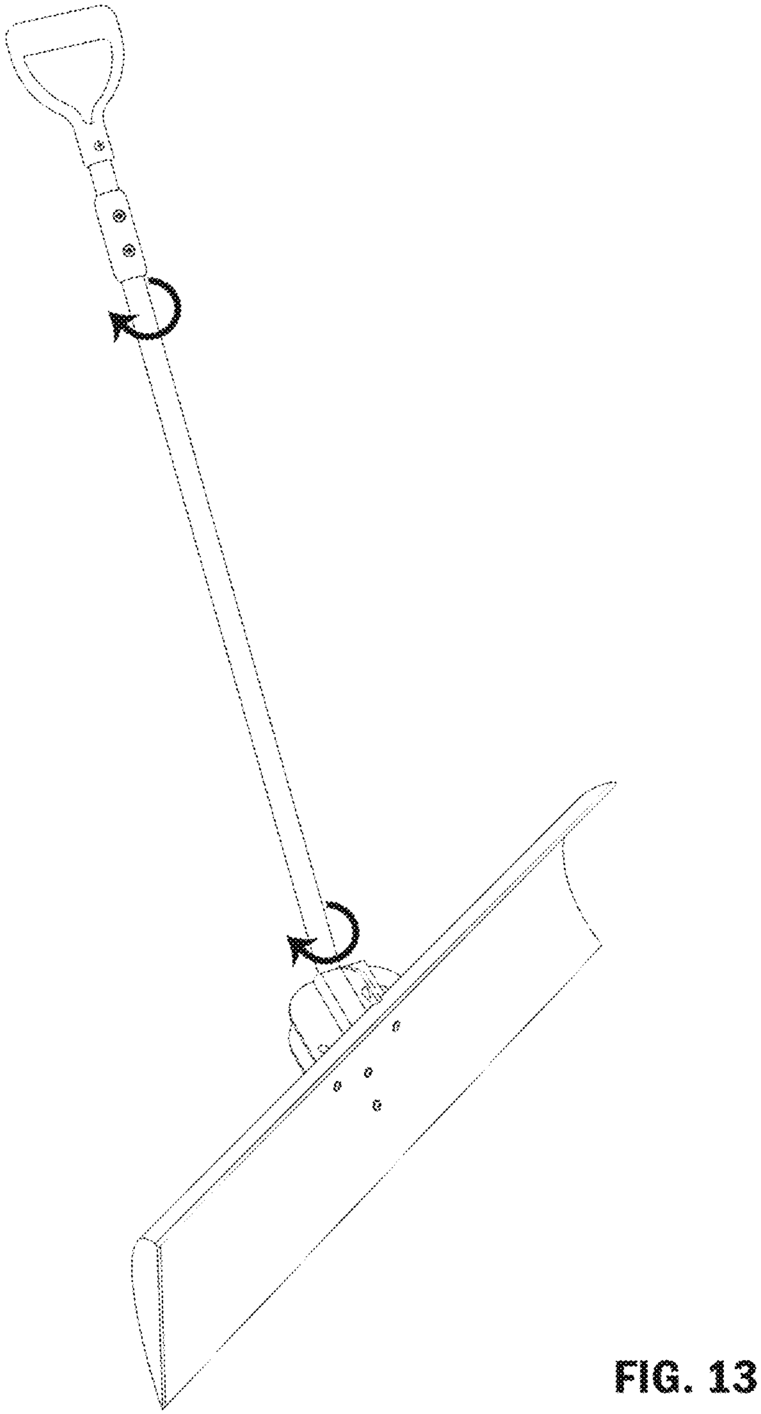
FIG. 13 is a front isometric perspective view of an overflow resistant articulating pusher shovel having a twist mechanism, according to some examples.
Figure 13B:
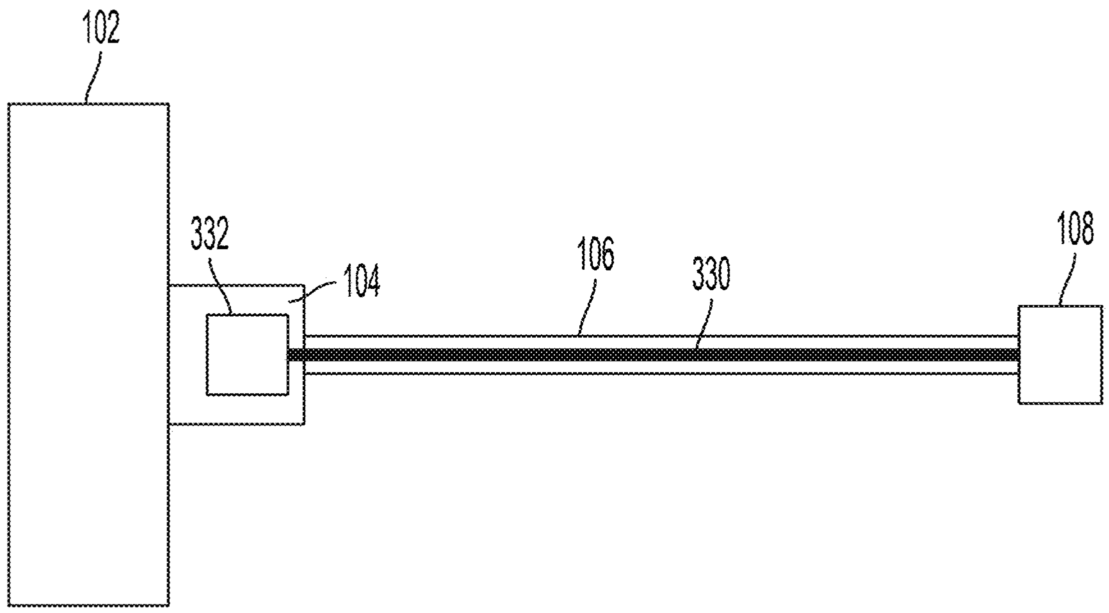
FIG. 13B is a schematic view of some features of an overflow resistant articulating pusher shovel having a twist mechanism, according to some examples.

FIG. 13B is a schematic view of some features of an overflow resistant articulating pusher shovel having a twist mechanism, according to some examples.

In one or more embodiments the overflow resistant articulating pusher shovel may include a twist mechanism that allows the relative angle of the head 102 to be articulated through a range of degrees relative to the shaft 106. Referring to FIG. 13B, the device may include a rotating handle 108 connected to a distal end of a driveshaft 330 that passes through the shaft 106. The proximal end of the driveshaft 330 may interface with a plurality of gears 332 located within the atlas 104. The twist of the handle 108 relative to the shaft 106 may turn these gears 332 within the atlas 104, and the turning of these gears 332 within the atlas 104 may turn the head 102.

To begin using the device, a user may first grasp the overflow resistant articulating pusher shovel by the handle 108 and along the shaft 106. The user may then push the device along the ground, thus causing the head 102 to displace material away from, and to the side of, the user. The end plate 110 may close one side of the head 102 so that material is only displaced by the user to the desired side. The user may then pull the slide 208 causing the locking pin 204 to release and allowing the shaft 106 to be repositioned within the pivot cavity 210 of the atlas 104. By this design the user may then reorient the head 102 relative to the shaft 106, and the user may then displace material away and to the opposite side of the prior configuration.

Figure 14:
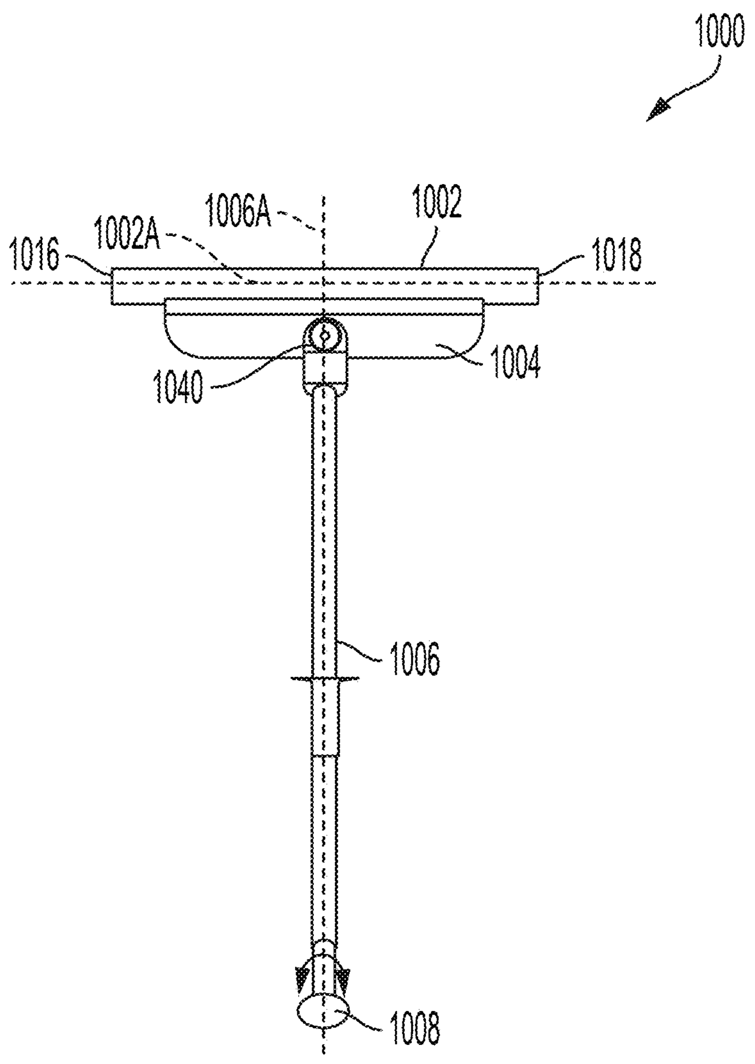
FIG. 14 is a top-down view of another articulating pusher shovel having a twist mechanism, according to some examples.
Figure 15:
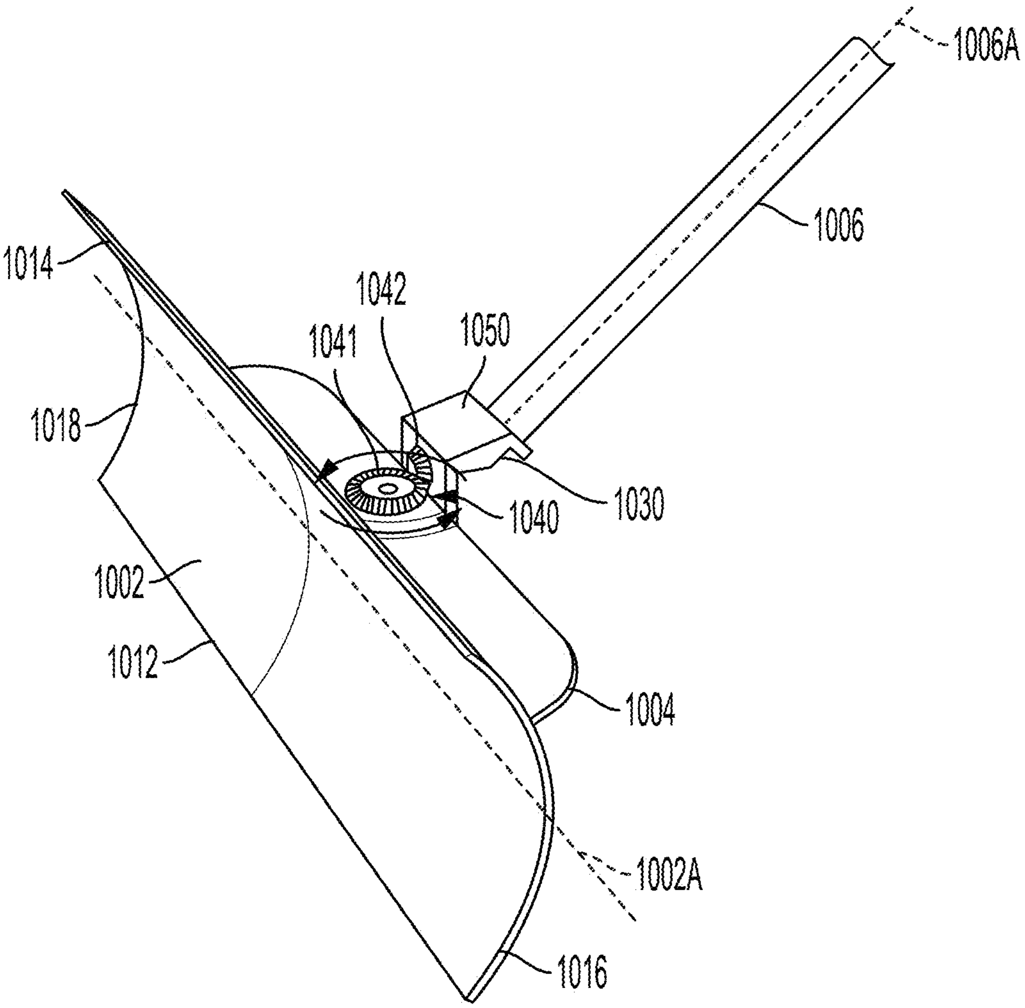
FIG. 15 is a perspective view of part of the articulating pusher shovel of FIG. 14.
Figure 16:
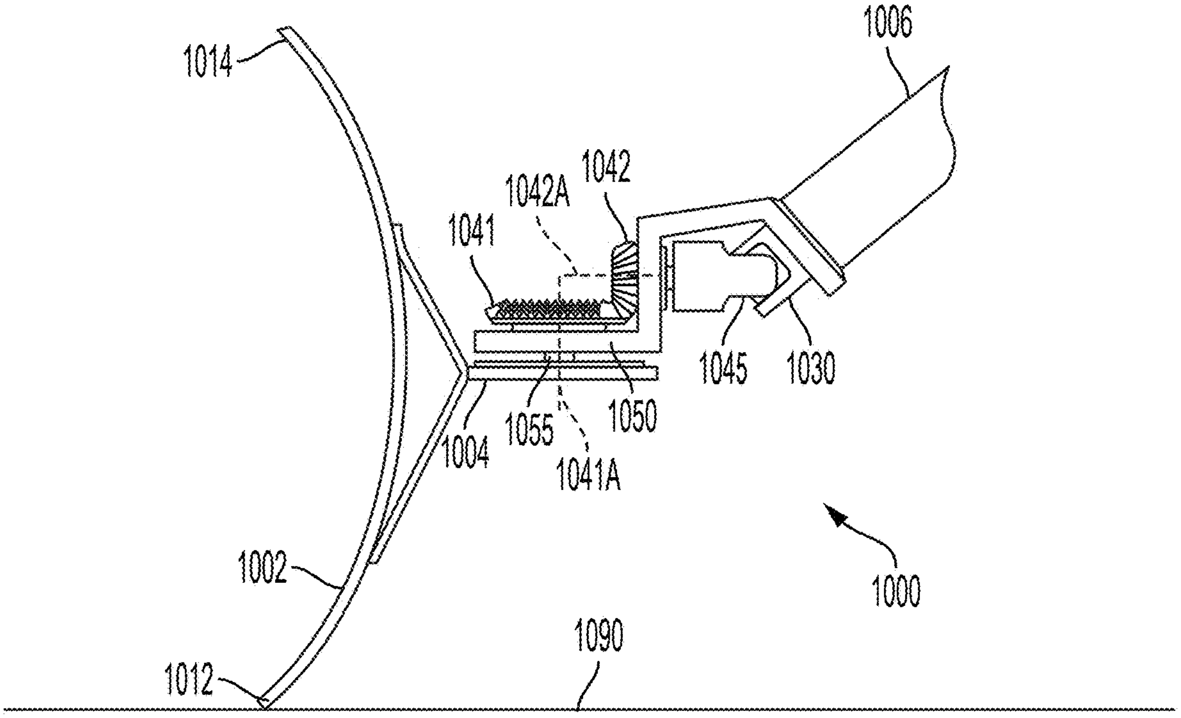
FIG. 16 is a side view of part of the articulating pusher shovel of FIG. 14.
Figure 17:
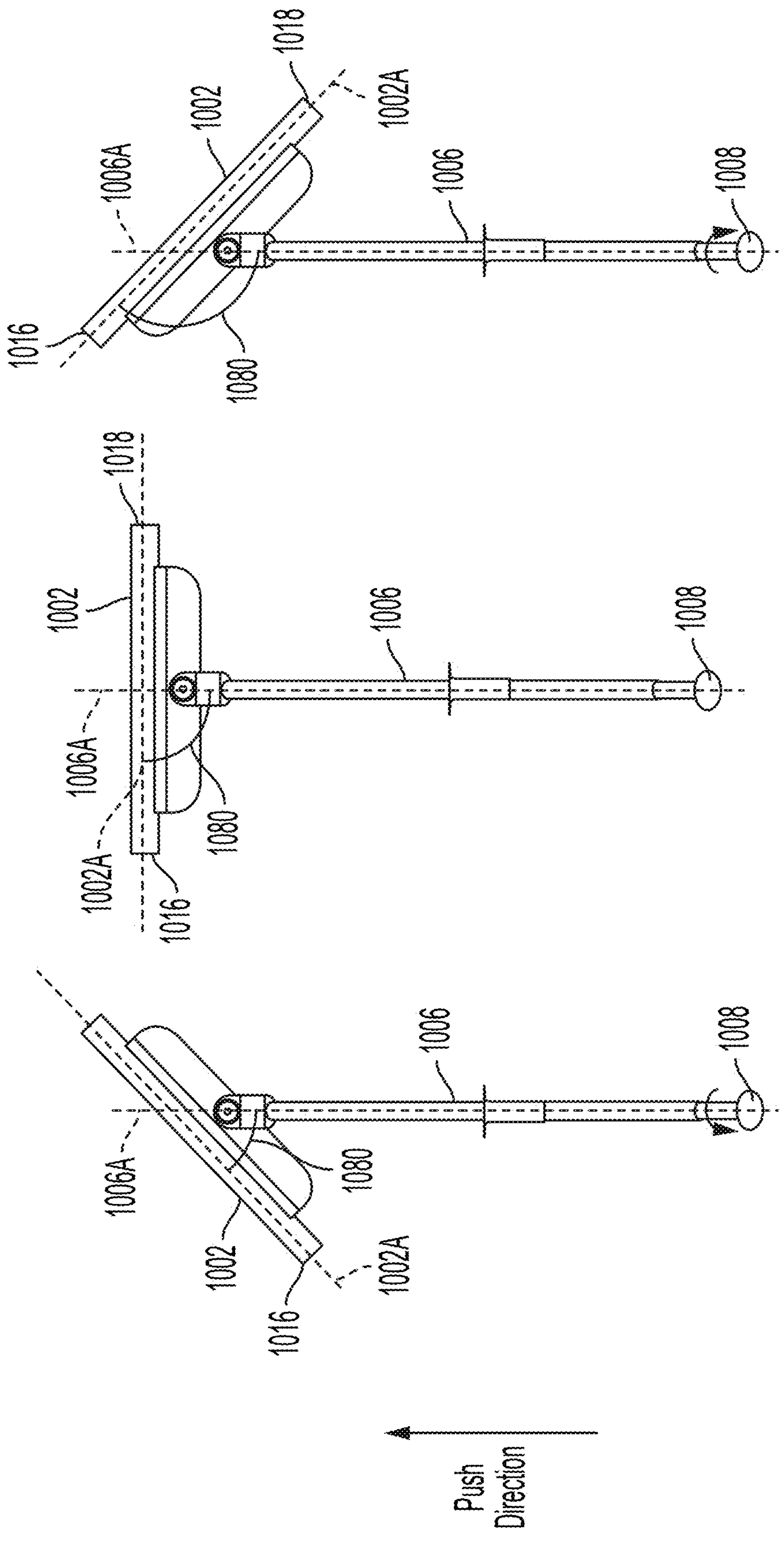
FIG. 17 includes three top-down views of the articulating pusher shovel of FIG. 14 with the head respectively positioned at three different angular positions relative to the shaft.
Figure 18:
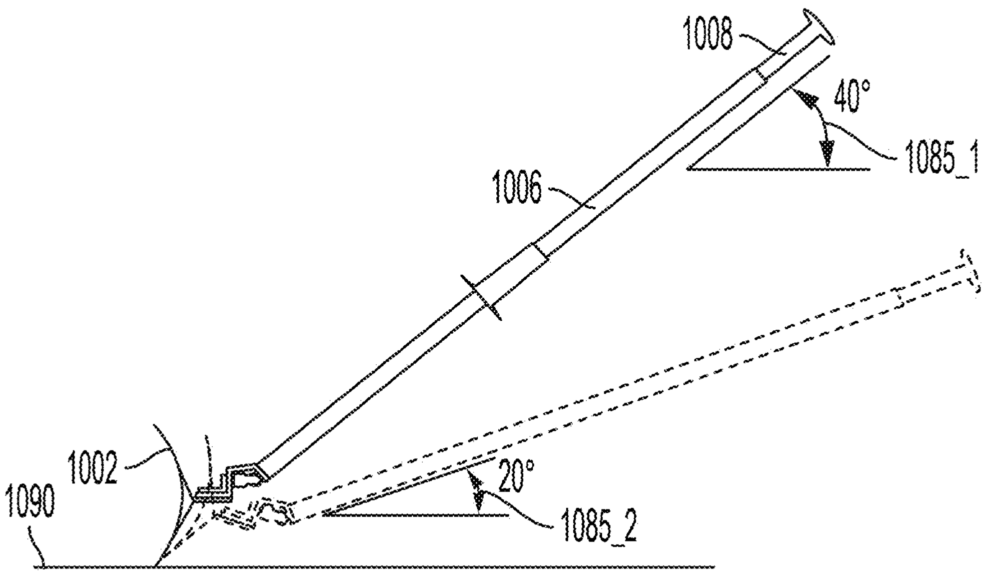
FIG. 18 includes two overlapping side views of the articulating pusher shovel of FIG. 14 with the shaft respectively positioned at two angular positions relative to a ground plane.

FIG. 14 is a top-down view of another articulating pusher shovel 1000 having a twist mechanism, according to some examples. FIG. 15 is a perspective view of part of the articulating pusher shovel 1000 of FIG. 14. FIG. 16 is a side view of a lower part of the articulating pusher shovel 1000 of FIG. 14. FIG. 17 includes three top-down views of the articulating pusher shovel 1000 of FIG. 14 with the head 1002 respectively positioned at three different angular positions relative to the shaft 1006. FIG. 18 includes two overlapping side views of the articulating pusher shovel 1000 of FIG. 14 with the shaft 1006 respectively positioned at two angular positions relative to a ground plane. The articulating pusher shovel 1000 may include features similar to, or the same as, features of other shovels described herein, and redundant descriptions may be omitted.

The articulating pusher shovel 1000 may include a head 1002, an atlas 1004 attached to the head 1002 (e.g., to a rear side of the head 1002), a shaft 1006 coupled to the atlas 1004, and a handle 1008 coupled to the shaft 1006. The atlas 1004 may be fixedly attached to the head 1002 such that the atlas 1004 is not configured to move (e.g., rotate) relative to the head 1002. The shaft 1006 may extend along a shaft axis 1006A between a proximal end of the shaft 1006 and a distal end of the shaft 1006. In some examples, the shaft 1006 is rotatably coupled to the atlas 1004 at its proximal end such that the head 1002 and atlas 1004 are rotatable relative to the shaft 1006 via a twist mechanism. The twist mechanism will be described in more detail below. The handle 1008 may be a rotatable handle that is rotatably coupled to the shaft 1006 and configured to cause the head 1002 to rotate, via the twist mechanism, in response to rotating relative to the shaft 1006. The rotatable handle 1008 may be positioned at the distal end of the shaft 1006, but the present disclosure is not limited thereto. For example, the rotatable handle 1008 may be positioned part way along the length of the shaft 1006 between the proximal and distal ends of the shaft 1006. In some other examples, the rotatable handle 1008 may even be indirectly coupled to, and spaced apart from, the distal end of the shaft 1006 via a driveshaft, as discussed in more detail below with respect to FIGS. 19-20.

The articulating pusher shovel 1000 may be a pusher shovel configured to be pushed along a ground plane 1090 to move material, such as snow, sand, or dirt. The head 1002 may have an elongated shape that extends along a head axis 1002A between a first side end 1016 and a second side end 1018 opposite thereto (e.g., left and right side ends). The head 1002 may also have a bottom edge 1012 and a top edge 1014 opposite thereto, which generally extend between the first side end 1016 and the second side end 1018. The bottom edge 1012 (and, in some examples, also the top edge 1014) may be a straight edge extending substantially parallel (e.g., within about 10 degrees, about 5 degrees, about 3 degrees, or about 1 degree from being parallel) to the head axis 1002A. The bottom edge 1012 may be an edge configured to contact, and be substantially parallel (e.g., within about 10 degrees, about 5 degrees, about 3 degrees, or about 1 degree from being parallel) to, the ground plane 1090 during use. The head 1002 may have a curved (e.g., semilunar, half-circle, circular segment, etc.) cross-section (e.g., in a plane perpendicular to the head axis 1002A) configured to allow material being pushed to build up in the head 1002. In some examples, the head 1002 may include an end plate at the first side end 1016 and/or at the second side end 1018.

The head 1002 may have a front surface that is configured to contact (e.g., collect) the material being pushed, and an opposite rear surface. The atlas 1004 may be attached to the rear surface of the head 1002 and may provide a structure or platform to which the shaft 1006 is coupled.

In some examples, the twist mechanism includes a drive-shaft 1030 that is installed in the shaft 1006 and that is coupled between the rotatable handle 1008 and a rotation mechanism at (e.g., in, on, or adjacent to) the atlas 1004 and/or the proximal end of the shaft 1006. For example, the shaft 1006 may be hollow, and the driveshaft 1030 may extend through at least part of the interior of the shaft 1006 from the rotation mechanism to the rotatable handle 1008. The driveshaft 1030 may include an elongated rod or pole that extends parallel to a shaft axis 1006A. In some examples, the driveshaft 1030 is concentrically oriented with the shaft 1006.

The driveshaft 1030 may be rotatable relative to the shaft 1006 (e.g., about the shaft axis 1006A), and may be fixedly coupled to the rotatable handle 1008, such that the driveshaft 1030 is not configured to rotate relative to the rotatable handle 1008. Thus, rotation of the rotatable handle 1008 may cause the driveshaft 1030 to rotate relative to the shaft 1006.

The rotation mechanism may be coupled between the atlas 1004 and the driveshaft 1030 such that rotation of the driveshaft 1030 causes the head 1002 to rotate relative to the shaft 1006. In the depicted example, the rotation mechanism includes a plurality of gears 1040 that the driveshaft 1030 is configured to couple to and that are configured to turn in response to the driveshaft 1030 rotating. The plurality of gears 1040 may include a first gear 1041 that is rotatable about a first axis 1041A, and a second gear 1042 that is rotatable about a second axis 1042A, which is non-parallel to the first axis 1041A. For example, the second axis 1042A may be substantially perpendicular (e.g., within about 10 degrees, about 5 degrees, about 3 degrees, or about 1 degree from being exactly perpendicular) to the first axis 1041A. The second gear 1042 may be coupled to the first gear 1041, such that rotation of the second gear 1042 causes rotation in the first gear 1041. The second gear 1042 may also be coupled (e.g., directly or indirectly coupled) to the drive-shaft 1030, such that rotation of the driveshaft 1030 causes rotation in the second gear 1042. In some examples, the driveshaft 1030 is coupled to the second gear 1042 via a universal joint 1045 (e.g., a u-joint) configured to translate rotation along one axis (e.g., the axis of the driveshaft 1030, such as the shaft axis 1006A) into rotation along another axis (e.g., the second axis 1042A). Other connection devices for coupling the driveshaft 1030 to the second gear 1042 are also within the scope of the present disclosure. In some examples, the universal joint 1045 forms part of the rotation mechanism.

The first gear 1041 may be fixedly coupled to the atlas 1004, such that the first gear 1041 is not configured to rotate relative to the atlas 1004 or head 1002. The first gear 1041 may be connected to the atlas 1004 via a pivot 1055 (e.g., a shaft or pole). The articulating pusher shovel 1000 may include a connection frame 1050 configured to rotatably couple the shaft 1006 to the pivot 1055 such that the connection frame 1050 and the shaft 1006 may rotate about the pivot 1055. For example, the connection frame 1050 may be fixedly attached to (e.g., form an integral part of) the proximal end of the shaft 1006, and may define an opening or hole that encircles the pivot 1055 to allow the connection frame 1050 to rotate about the pivot 1055 (e.g., about the first axis 1041A).

The first axis 1041A may be substantially perpendicular (e.g., within about 10 degrees, about 5 degrees, about 3 degrees, or about 1 degree from being exactly perpendicular) to the head axis 1002A. In some examples, the first axis 1041A is configured to be perpendicular to the ground plane 1090 when the articulating pusher shovel 1000 is oriented with the bottom edge 1012 contacting the ground plane 1090 and the shaft 1006 forming a certain shaft angle (e.g., an angle between 0 and 90 degrees) relative to the ground plane 1090.

As shown in FIG. 18, the articulating pusher shovel 1000 may be configured to be used in different orientations relative to the ground plane to accommodate persons of different height. The shaft 1006 may thus form different shaft angles relative to the ground plane 1090 depending on the shovel's orientation relative to the ground. For example, FIG. 18 shows the articulating pusher shovel 1000 in a first orientation, with a first shaft angle 1085_1 of 40 degrees, and in a second orientation with a second shaft angle 1085_2 of 20 degrees.

The twist mechanism may be configured to allow the head 1002 to rotate in a side-to-side manner, as shown in FIG. 17, which shows three top-down views of the articulating pusher shovel 1000 with the head 1002 in three different angular positions relative to the shaft 1006. The head axis 1002A may form a variable head angle 1080 relative to the shaft axis 1006A, which may be adjusted by rotating the head 1002 via the rotatable handle 1008. Because the shaft axis 1006A may not intersect with the head axis 1002A in some examples, the head angle 1080 may be defined as an angle between the shaft axis 1006A and a ray that is parallel to the head axis 1002A, and that extends from an origin point on the shaft axis 1006A.

In the middle illustration in FIG. 17, the head 1002 is in a neutral position with a head angle 1080 of 90 degrees. Starting from the neutral position, when the rotatable handle 1008 is rotated to the left, the head 1002 may rotate in one direction (e.g., counterclockwise) such that the head angle 1080 is reduced, as shown in the left illustration. If the rotatable handle 1008 is instead rotated to the right, the head 1002 may rotate in the opposite direction (e.g., clockwise) such that the head angle 1080 increases, as shown in the right illustration.

First and second distances may be respectively defined between the shaft 1006 (or a set position on the shaft 1006) and the first side end 1016 and the second side end 1018 of the head 1002. Because the head 1002 is configured to be rotated in a side-to-side manner, the first and second distances may be adjustable. For example, it may be seen in the left illustration of FIG. 17 that the first side end 1016 is closer to the shaft 1006 (and to the distal end of the shaft 1006) than the second side end 1018 is. It can also be seen in the right illustration of FIG. 17 that the first side end 1016 is farther from the shaft 1006 (and from the distal end of the shaft 1006) than the second side end 1018 is. As the head 1002 is rotated, the first and second distances may change in opposite directions. For example, in FIG. 17, as the head 1002 is rotated from the neutral position, shown in the middle illustration, to the position shown in the left illustration, the first distance between the first side end 1016 and the shaft 1006 (or the distal end of the shaft 1006) may decrease while the second distance between the second side end 1018 and the shaft 1006 (or the distal end of the shaft 1006) may increase.

When a pusher shovel is used to remove material, such as snow, a problem may arise where the material begins to overflow outwardly from both the left and right sides of the shovel head as the user pushes in a straight line. As the user pushes through a plurality of lines, this overflow may result in a plurality or ridges of material, which the user may then go back and remove. The articulating pusher shovel 1000 of examples of the present disclosure solves this problem by allowing the head 1002 to be rotated in a side-by-side manner. When the head 1002 is rotated to the left (e.g., as shown in the left illustration of FIG. 17), and the user pushes the shovel straight forward (e.g., along the push direction in FIG. 17), the head 1002 will force the material both forwardly and toward the left. This will cause the overflowing material to overflow only out of the left side of the head 1002 (as opposed to both out of the left and right sides). Similarly, when the head 1002 is rotated to the right (e.g., as shown in the right illustration of FIG. 17), and the user pushes the shovel straight forward (e.g., along the push direction in FIG. 17), the head 1002 will force the material both forwardly and toward the right so that the overflowing material only overflow out of the right side of the head 1002.

Accordingly, the articulating pusher shovel 1000 of examples of the present disclosure may reduce or prevent the occurrence of the above-described ridges of material that otherwise tend to be left after the user pushes through a plurality of adjacent and parallel lines. If the user pushes through all of the lines along the same direction (i.e., walking back to the same starting point after finishing one line and before starting the next line), the user may keep the head 1002 in a constant orientation. For example, if the user is steadily working leftward, line by line, and the head 1002 is always biased toward the left (e.g., as shown in the left illustration of FIG. 17), then the overflowing material will be consistently funneled leftward into the unremoved material, which is not a problem. If, instead, the user turns around after finishing each line, and pushes through the next line along the opposite direction, the user may rotate the head 1002 from side to side as the user pushes through the plurality of lines. This will also cause the overflowing material to be consistently funneled into unremoved material. As a result, the user can more efficiently finish his or her work without leaving the above-described ridges of remnant material. Moreover, by enabling the head 1002 to be rotated via rotation of the rotatable handle 1008, the user may easily, conveniently, and comfortably rotate the head 1002 via the described twist mechanism.

Figure 19:
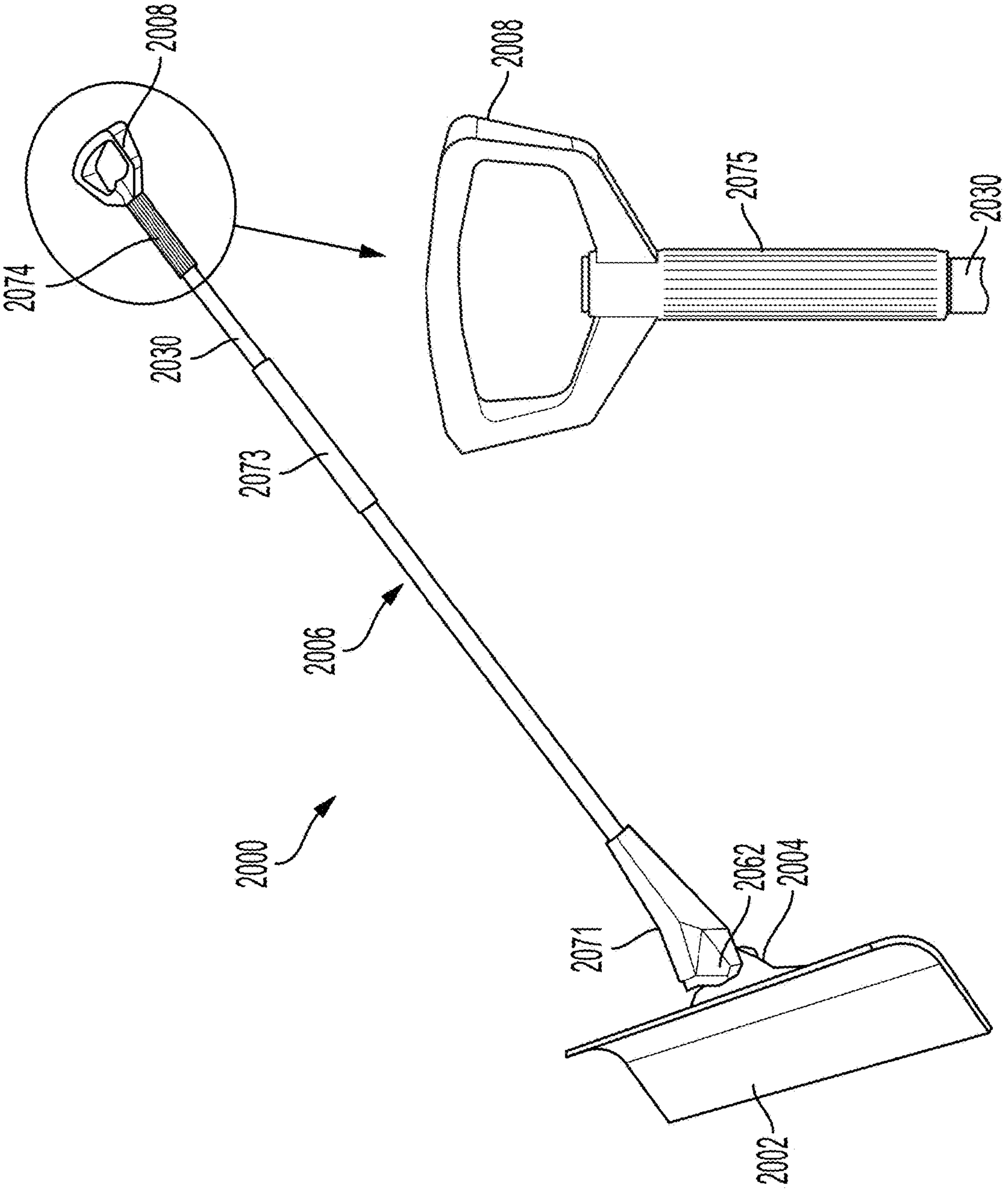
FIG. 19 includes a perspective view of another articulating pusher shovel having a twist mechanism, according to some examples, and an enlarged view of an upper portion of the articulating pusher shovel.
Figure 20:
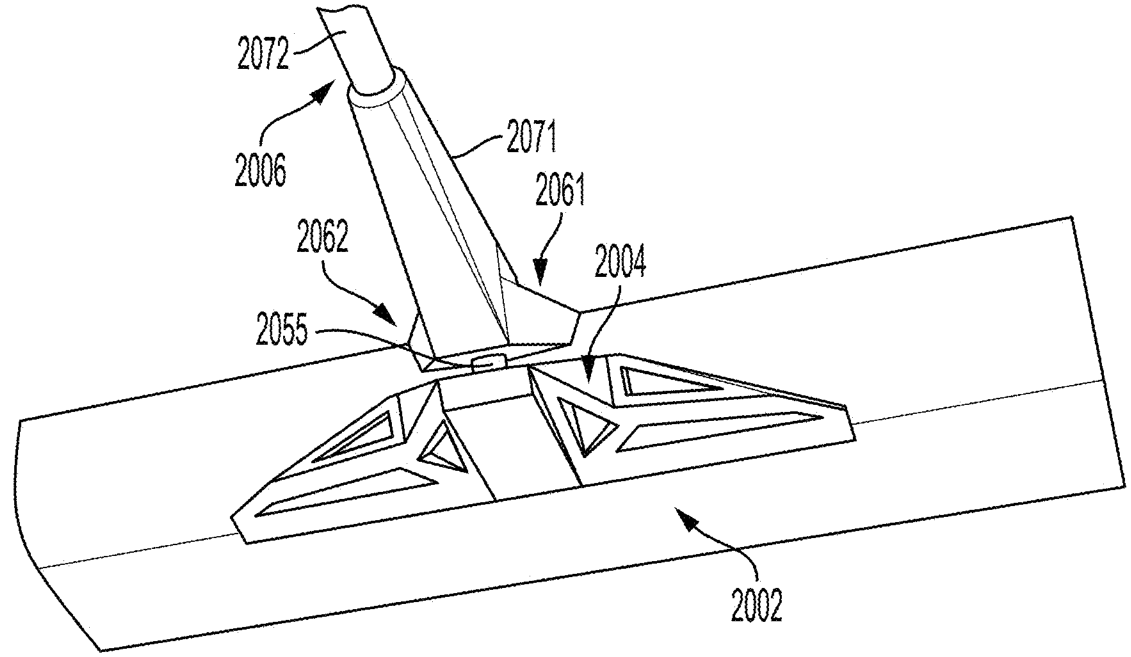
FIG. 20 is a back view of a lower portion of the articulating pusher shovel of FIG. 19.

FIG. 19 is a perspective view of another articulating pusher shovel 2000 having a twist mechanism, according to some examples, and an enlarged view of an upper portion of the articulating pusher shovel 2000. FIG. 20 is a back view of a lower portion of the articulating pusher shovel 2000 of FIG. 19. The articulating pusher shovel 2000 may have some features similar to, or the same as, other shovels described herein, including the articulating pusher shovel 1000, and redundant descriptions may be omitted.

The articulating pusher shovel 2000 may include a shovel head 2002, an atlas 2004 attached to the shovel head 2002, a shaft 2006 rotatably coupled at a proximal end to the atlas 2004, a rotatable handle 2008 that is rotatably coupled to the shaft 2006, and a twist mechanism configured to rotate the shovel head 2002 side-to-side relative to the shaft 2006 in response to rotation of the rotatable handle 2008. The twist mechanism may include a driveshaft 2030 installed in the shaft 2006 and coupled between the rotatable handle 2008 and a rotation mechanism. The twist mechanism and the rotation mechanism may include features similar to, or the same as, the twist mechanism and rotation mechanism described with respect to the articulating pusher shovel 1000.

The shaft 2006 may include a base structure 2071 at (e.g., adjacent to) the proximal end of the shaft 2006. The base structure 2071 may include a housing that contains (e.g., surrounds) at least some components of the rotation mechanism, and that is configured to rotate about a pivot 2055 attached to the atlas 2004. The base structure 2071 may also include a first bumper 2061 and a second bumper 2062 that respectively protrude from opposite sides of the base structure 2071 and towards the shovel head 2002. The first bumper 2061 and the second bumper 2062 may be configured (e.g., shaped and sized) to abut the shovel head 2002 and/or the atlas 2004 when the shovel head 2002 rotates to first and second angular positions relative to the shaft 2006. The first bumper 2061 and the second bumper 2062 may therefore reduce or prevent the likelihood of the shovel head 2002 rotating beyond the first and second angular positions, and may restrict rotation of the shovel head 2002 to a set range (e.g., a range equal to or less than about 150 degrees, about 130 degrees, about 110 degrees, about 90 degrees, or about 70 degrees).

The shaft 2006 may be made of a first material (e.g., fiberglass), and may have a lower grip 2073 at a distal end of the shaft 2006. The driveshaft 2030 may extend out from the distal end of the shaft 2006 to the rotatable handle 2008. In some examples, an upper grip 2074 is on the portion of the driveshaft 2030 that extends out from the shaft 2006. The upper grip may be spaced apart from the lower grip 2073 and, in some examples, integrated with the rotatable handle 2008. The lower grip 2073 and the upper grip 2074 may be made of a soft material, such as rubber, and may have a textured (e.g., ribbed) surface configured to improve a user's grip. The lower and upper grips 2073 and 2074 may be positioned to allow a user to comfortably grip the articulating pusher shovel 2000 with two hands. This may allow the user to better control the articulating pusher shovel 2000 while pushing material and also to rotate the rotatable handle 2008 with respect to the shaft 2006 more easily.

Figure 21:
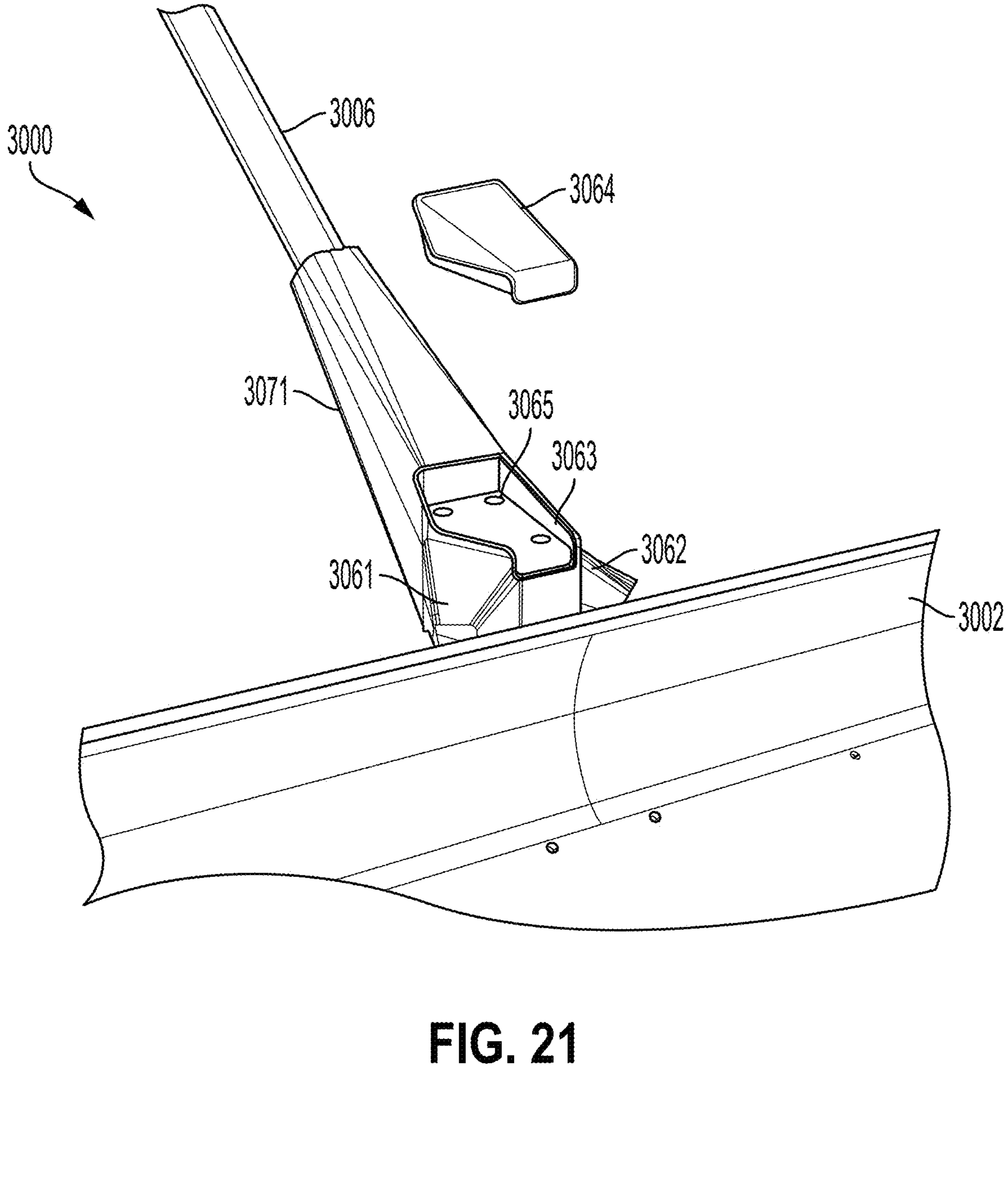
FIG. 21 is a front view of a lower portion of another articulating pusher shovel having a twist mechanism, according to some examples, and with a light-emitting element removed from a base structure.
Figure 22:
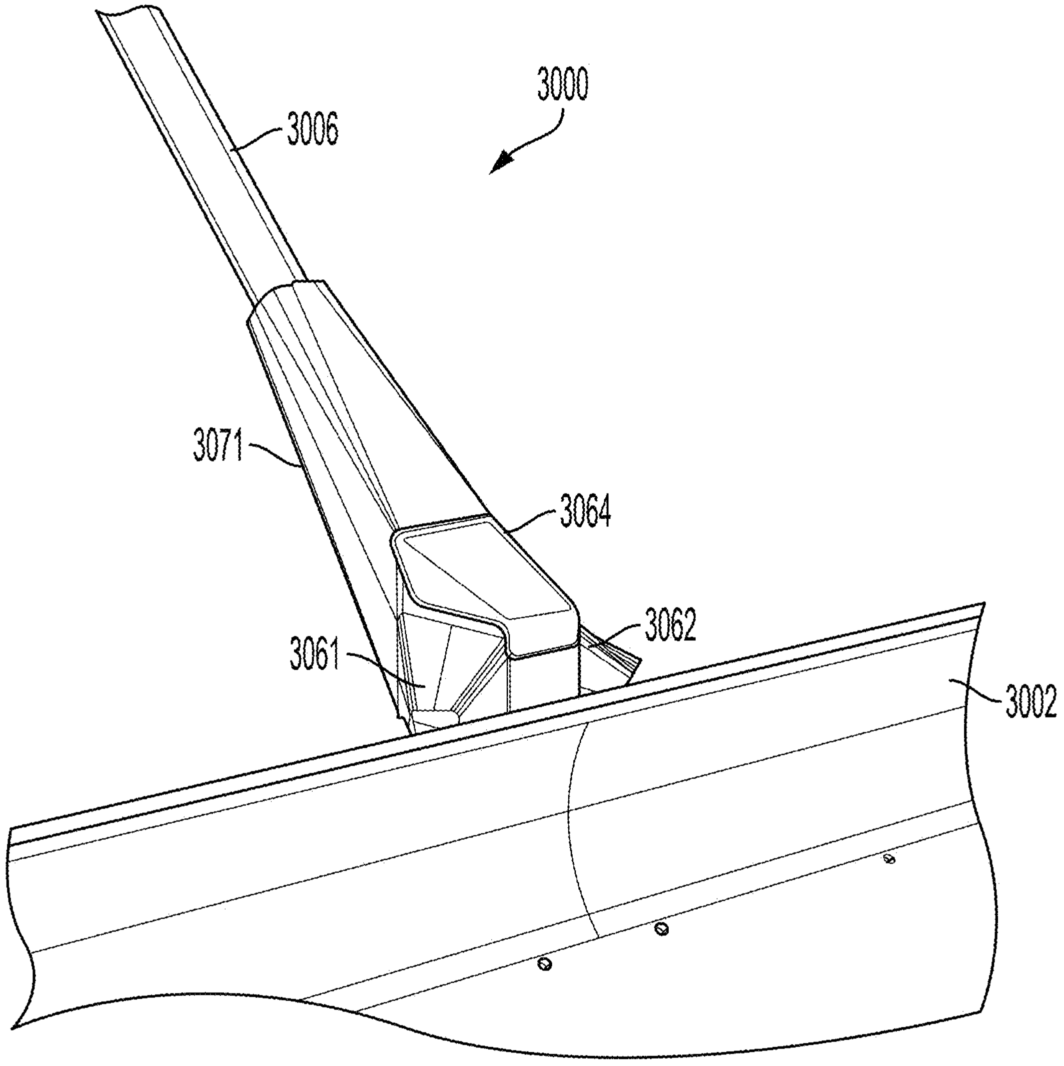
FIG. 22 is a front view of the lower portion of the articulating pusher shovel of FIG. 21 with the light-emitting element installed in the base structure.
Figure 23:
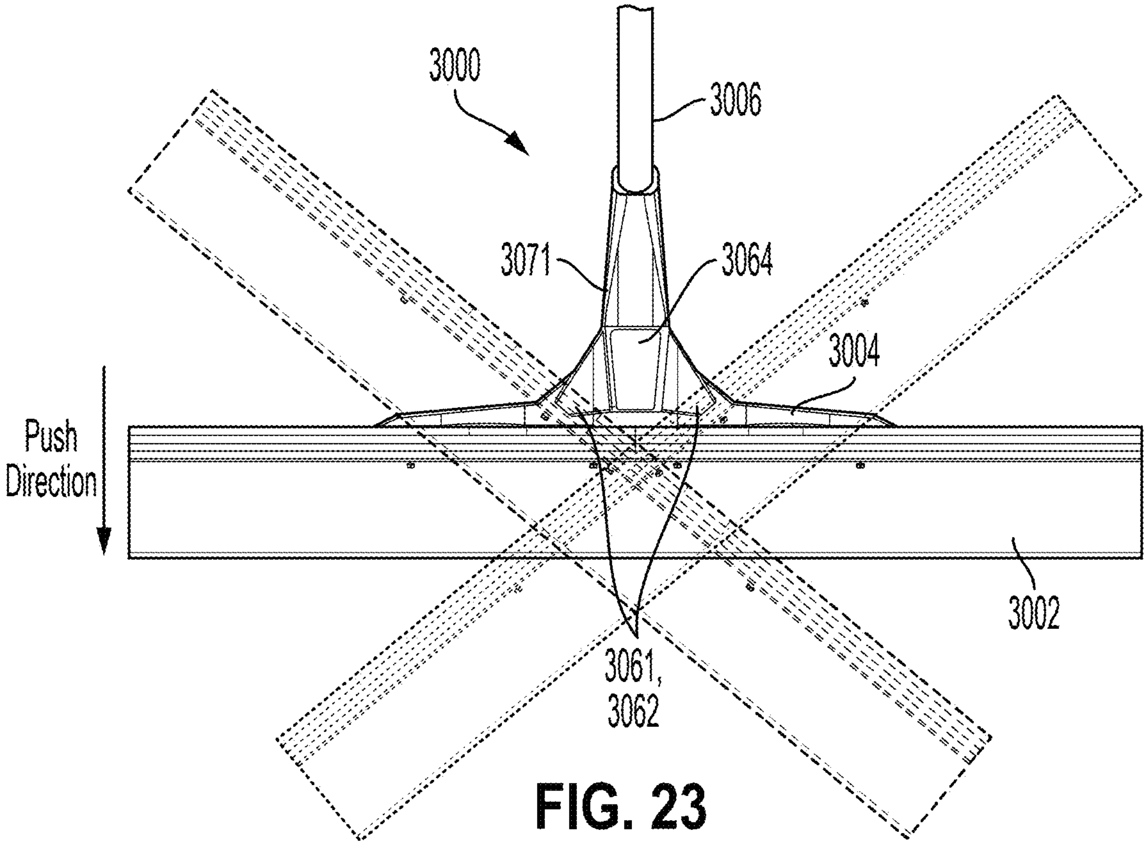
FIG. 23 includes three overlapping top-down views of the articulating pusher shovel of FIG. 21 with the head respectively positioned at three different angular positions relative to the shaft.

FIG. 21 is a front view of a lower portion of another articulating pusher shovel 3000 having a twist mechanism, according to some examples, and with a light-emitting element 3064 removed from a base structure 3071. FIG. 22 is a front view of the lower portion of the articulating pusher shovel 3000 of FIG. 21 with the light-emitting element 3064 installed in the base structure 3071. FIG. 23 includes three overlapping top-down views of the articulating pusher shovel 3000 of FIG. 21 with the shovel head 3002 respectively positioned at three different angular positions relative to the shaft 3006. The articulating pusher shovel 3000 may include some features similar to, or the same as, features of other shovels described herein, including the articulating pusher shovels 1000 and 2000, and redundant descriptions may be omitted.

The articulating pusher shovel 3000 may include a shovel head 3002, an atlas 3004 attached to the shovel head 3002, a shaft 3006 rotatably coupled at a proximal end to the atlas 3004, a handle rotatably coupled to the shaft 3006, and a twist mechanism configured to rotate the shovel head 3002 relative to the shaft 3006 when the handle is rotated. The twist mechanism may include features similar to, or the same as, features of twist mechanisms described herein. For example, the twist mechanism may include a driveshaft installed in the shaft 3006 and coupled between the handle and a rotation mechanism.

The shaft 3006 may include a base structure 3071 that is configured to house (e.g., contain) at least part of the rotation mechanism and a light-emitting element 3064. The light-emitting element 3064 may be configured to generate light and to illuminate the region (e.g., the ground) in front of the shovel head 3002. This may improve the user's visibility of the along the direction that the user pushes the articulating pusher shovel 3000. In some examples, the light-emitting element 3064 includes a light-emitting diode (LED) configured to generate at least part of the light, but the present disclosure includes other examples of light-emitting elements. The light-emitting element 3064 may include a battery (e.g., a non-rechargeable or rechargeable battery) configured to provide the power to generate the light.

In some examples, the light-emitting element 3064 is detachably couplable to the base structure 3071. For example, the base structure 3071 may have a recess (e.g., an indent or pocket) shaped and sized to receive at least part of the light-emitting element 3064, and the light-emitting element 3064 may be configured to be secured to the base structure 3071 within the recess. In some examples, the light-emitting element 3064 is configured to be secured to the base structure 3071 via one or more first magnets 3065 in the base structure 3071 and one or more second magnets in the light-emitting element 3064. In some other examples, the light-emitting element 3064 may be secured to the base structure 3071 in another manner, such as by one or more fasteners, a snap-fit mechanism, etc. In some examples where the light-emitting element 3064 includes a rechargeable battery, the light-emitting element 3064 may be removed from the base structure 3071 and may be recharged while the articulating pusher shovel 3000 is not in use, and secured to the base structure 3071 when the light-emitting element 3064 is needed. The light-emitting element 3064 may be useful, for example, in circumstances where a user desires to remove material in a dark or dimly lit setting, such as when shoveling snow out of a driveway in the early morning hours before it is light outside.

The base structure 3071 may also include a first bumper 3061 and a second bumper 3062 configured to abut against the shovel head 3002 or atlas 3004 when the shovel head 3002 is rotated to first and second angular positions, respectively. Because the light-emitting element 3064 is secured to the base structure 3071, the light-emitting element 3064 will not rotate when the shovel head 3002 rotates relative to the shaft 3006. Thus, the light-emitting element 3064 may illuminate the ground in front of the user along the direction that the user is pushing, regardless of how the shovel head 3002 is rotated relative to the shaft 3006. This is illustrated in FIG. 23, where both the push direction and the direction of illumination of the light-emitting element 3064 remain constant and aligned in all three angular positions of the shovel head 3002. In some examples, the light-emitting element 3064 is configured to be coupled elsewhere to the shaft 3006 besides the base structure 3071, for example, at a position above the base structure 3071.

Figure 24:
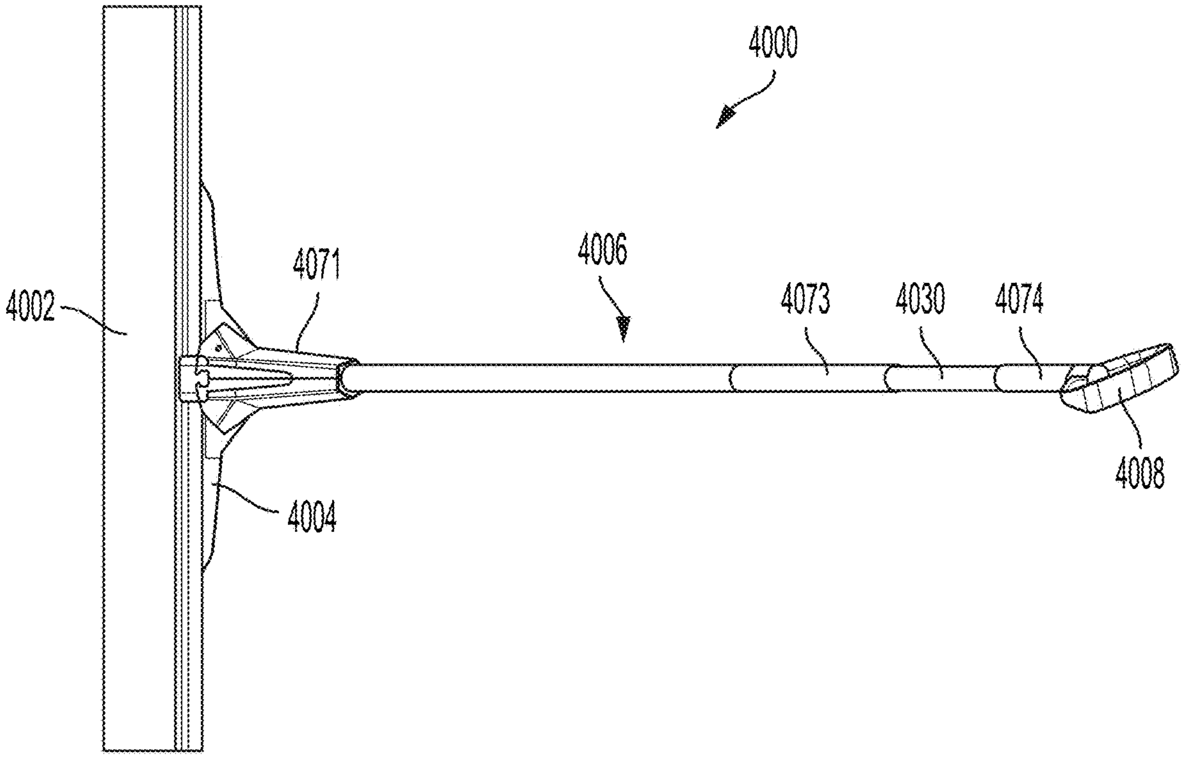
FIG. 24 is a top-down view of another articulating pusher shovel having a twist mechanism, according to some examples.
Figure 25:
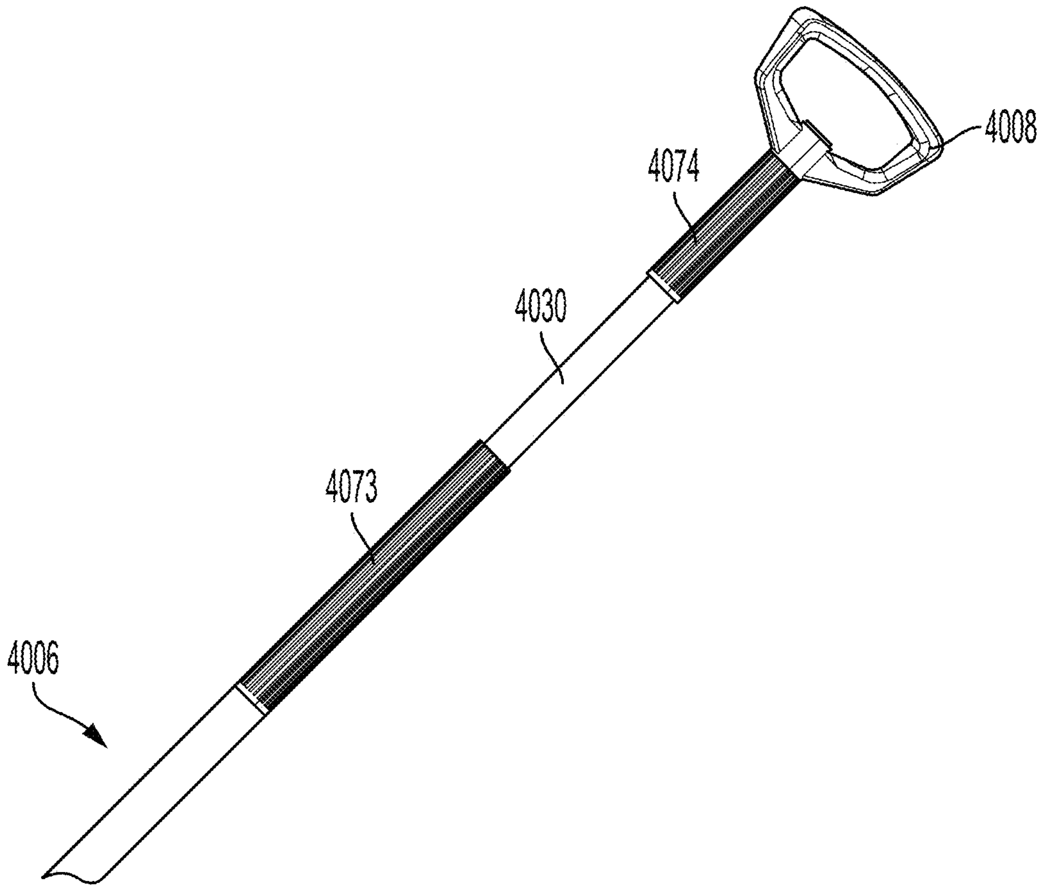
FIG. 25 is a perspective view of an upper portion of the articulating pusher shovel of FIG. 24.
Figure 26:
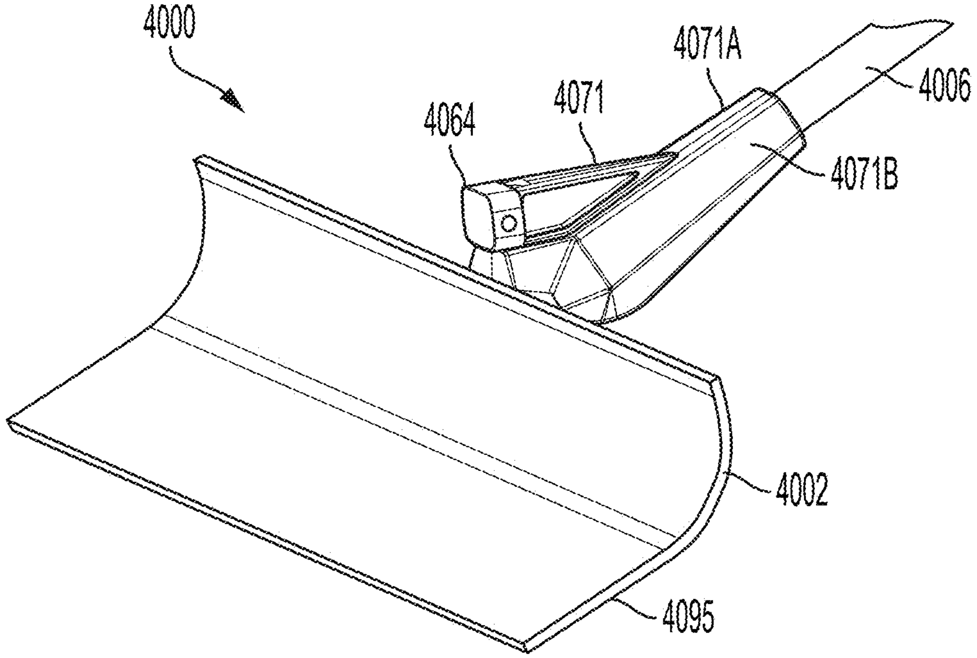
FIG. 26 is a front perspective view of a lower portion of the articulating pusher shovel of FIG. 24.
Figure 27:
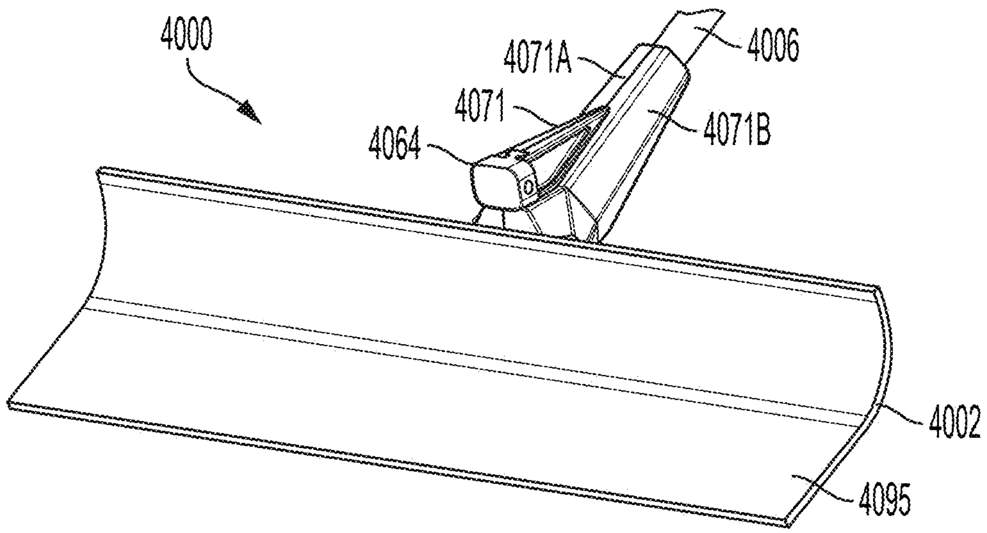
FIG. 27 is another front perspective view of a lower portion of the articulating pusher shovel of FIG. 24.
Figure 28:
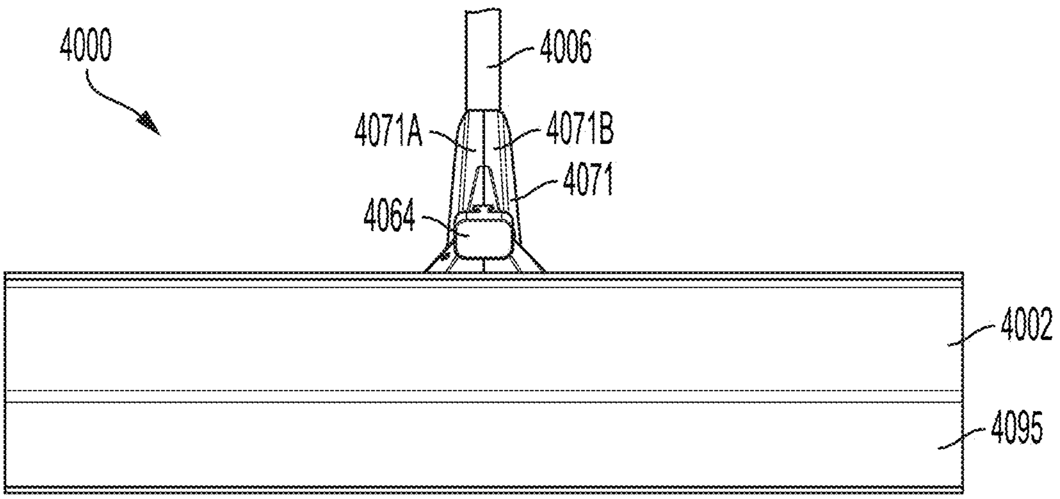
FIG. 28 is a front view of a lower portion of the articulating pusher shovel of FIG. 24.
Figure 29:
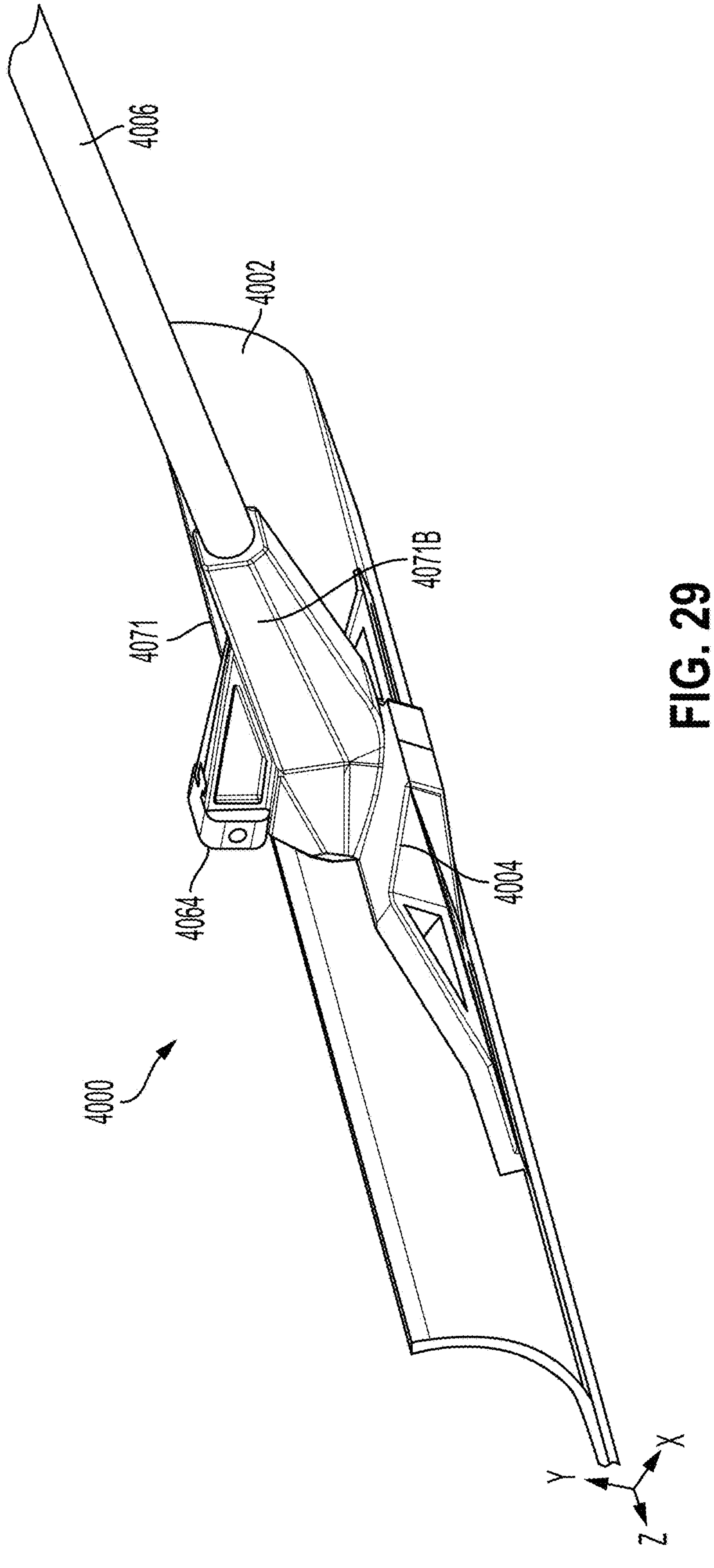
FIG. 29 is a rear perspective view of a lower portion of the articulating pusher shovel of FIG. 24.
Figure 30:
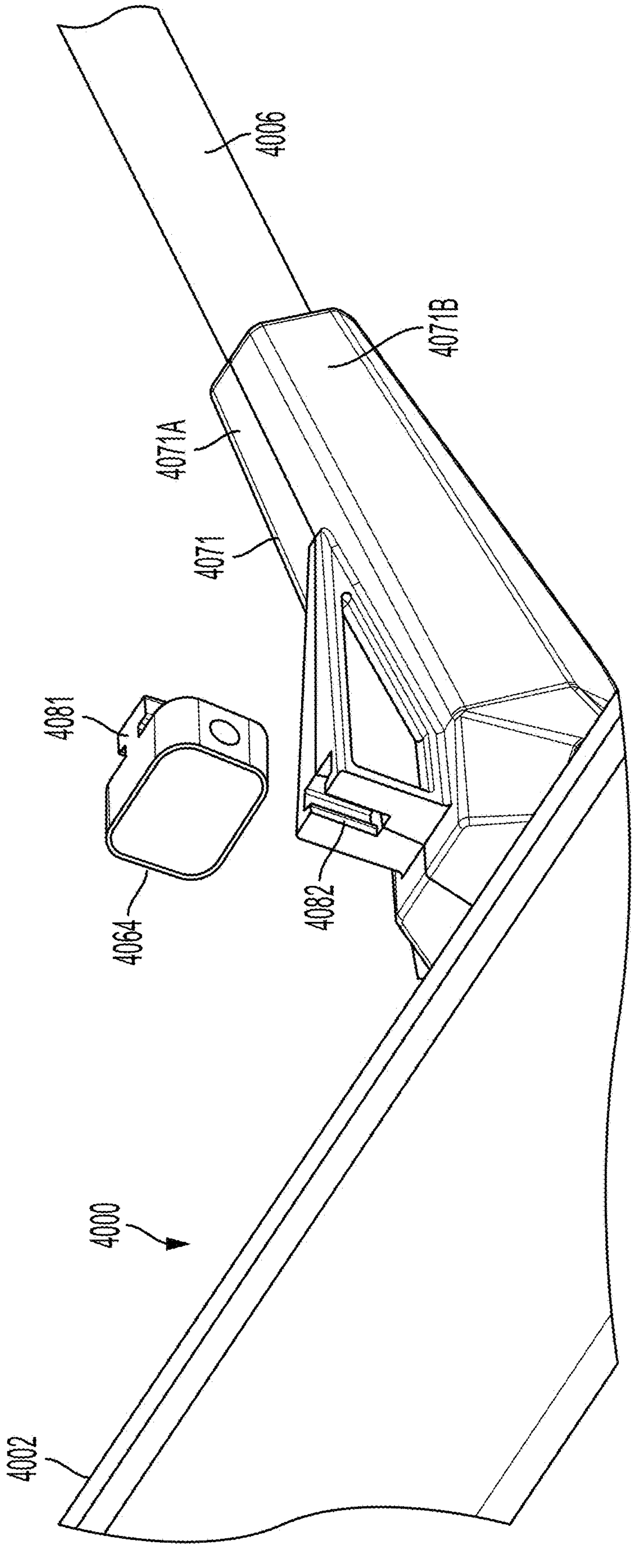
FIG. 30 is another front perspective view of a lower portion of the articulating pusher shovel of FIG. 24 with a light-emitting element removed from a base structure.
Figure 31:
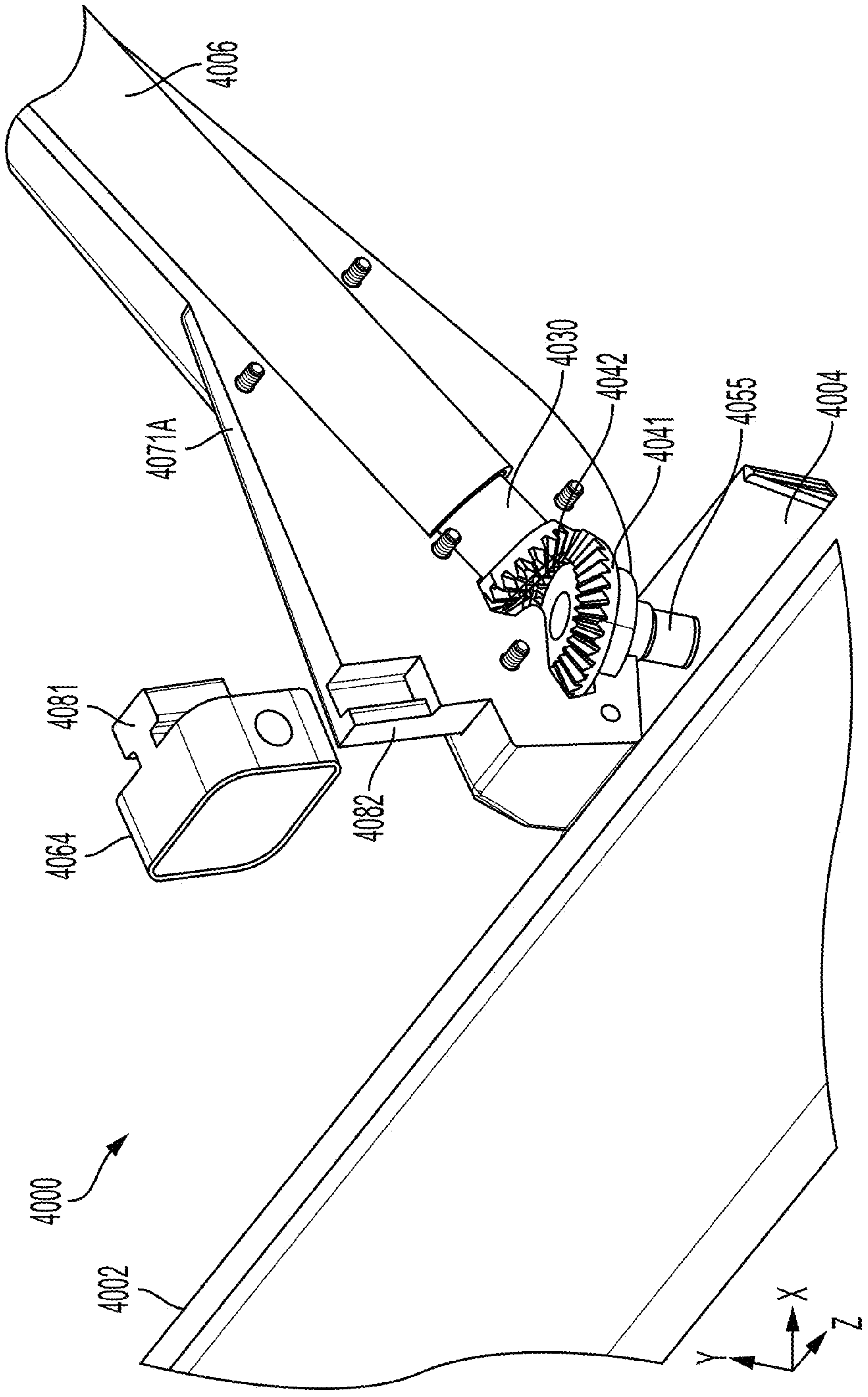
FIG. 31 is another front perspective view of a lower portion of the articulating pusher shovel of FIG. 24 with the light-emitting element removed and with a piece of the base structure removed.
Figure 32:
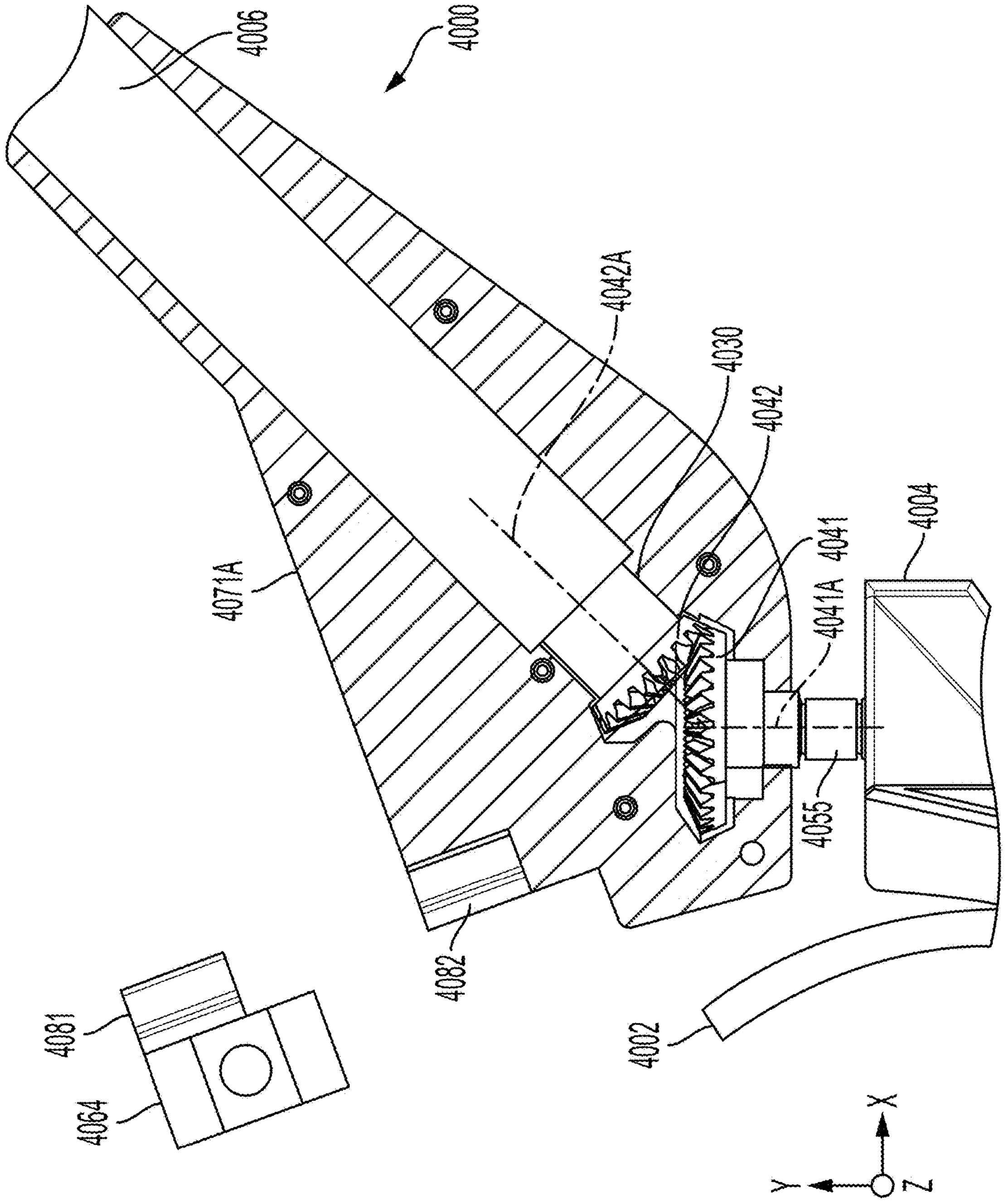
FIG. 32 is a side view of a lower portion of the articulating pusher shovel of FIG. 24 with the light-emitting element removed and with a piece of the base structure removed.

FIG. 24 is a top-down view of another articulating pusher shovel 4000 having a twist mechanism, according to some examples. FIG. 25 is a perspective view of an upper portion of the articulating pusher shovel 4000 of FIG. 24. FIG. 26 is a front perspective view of a lower portion of the articulating pusher shovel 4000 of FIG. 24. FIG. 27 is another front perspective view of a lower portion of the articulating pusher shovel 4000 of FIG. 24. FIG. 28 is a front view of a lower portion of the articulating pusher shovel 4000 of FIG. 24. FIG. 29 is a rear perspective view of a lower portion of the articulating pusher shovel 4000 of FIG. 24. FIG. 30 is another front perspective view of a lower portion of the articulating pusher shovel of FIG. 24 with a light-emitting element 4064 removed from a base structure 4071. FIG. 31 is another front perspective view of a lower portion of the articulating pusher shovel 4000 of FIG. 24 with the light-emitting element 4064 removed and with a piece of the base structure 4071 removed. FIG. 32 is a side view of a lower portion of the articulating pusher shovel 4000 of FIG. 24 with the light-emitting element 4064 removed and with a piece of the base structure 4071 removed. The articulating pusher shovel 4000 may include some features similar to, or the same as, features of other shovels described herein, including the articulating pusher shovels 1000, 2000, and 3000, and redundant descriptions may be omitted.

The articulating pusher shovel 4000 may include a shovel head 4002, an atlas 4004 attached to the shovel head 4002, a shaft 4006 rotatably coupled at a proximal end to the atlas 4004, a handle 4008 rotatably coupled to the shaft 4006, and a twist mechanism configured to rotate the shovel head 4002 relative to the shaft 4006 when the handle is rotated. The twist mechanism may include features similar to, or the same as, features of twist mechanisms described herein. For example, the twist mechanism may include a driveshaft 4030 installed in the shaft 4006 and coupled between the rotating handle 4008 and a rotation mechanism. In some examples, the driveshaft 4030 extends out from the distal end of the shaft 4006 to the handle 4008, and the articulating pusher shovel 4000 includes a lower grip 4073 on the shaft 4006 (e.g., on a distal end of the shaft 4006) and an upper grip 4074 on the exposed portion of the driveshaft 4030 and/or adjacent to (e.g., integrated with) the rotating handle 4008. The lower and upper grips 4073 and 4074 may have features similar to, or the same as, features of the lower and upper grips 2073 and 2074 of the articulating pusher shovel 2000.

The rotation mechanism of the twist mechanism may include a plurality of gears, including a first gear 4041, attached (e.g., fixedly attached) to the atlas 4004 and rotatable about a first axis 4041A, and a second gear 4042 coupled to the first gear 4041 and rotatable about a second axis 4042A. In some examples, the driveshaft 4030 is directly attached to the second gear 4042 such that the driveshaft 4030 and the second gear 4042 are configured to rotate together and about a common axis (e.g., the axis of the shaft 4006). The second axis 4042A of the second gear 4042 may form an angle relative to the first axis 4041A of the first gear 4041 of between about 90 degrees and about 180 degrees (e.g., about 135 degrees). Because the first and second gears 4041 and 4042 may be arranged relative to each other such that an obtuse angle is formed between the corresponding first and second axes 4041A and 4042A, an intermediate component (e.g., a universal joint) may be omitted from between the second gear 4042 and the driveshaft 4030. This can reduce the cost, complexity, and number of components of the rotation mechanism and shovel.

The shaft 4006 may include a base structure 4071 that is configured to house (e.g., contain) the rotation mechanism (e.g., the first and second gears 4041 and 4042) and at least part of a light-emitting element 4064. In some examples, the base structure 4071 includes a plurality of pieces (e.g., two half pieces) attached together and are configured to at least partly surround the rotation mechanism. For example, the base structure 4071 may include a first side piece 4071A (e.g., a right-side half piece) and a second side piece 4071B (e.g., a left-side half piece) that are attached together, for example, via one or more fasteners. In FIGS. 31 and 32, the second side piece 4071B is removed to show how the base structure 4071 at least partly surrounds the first gear 4041, the second gear 4042, and the proximal end of the shaft 4006.

The light-emitting element 4064 may be configured to generate light and to illuminate the region (e.g., the ground) in front of the shovel head 4002. The light-emitting element 4064 may include features similar to, or the same as, features of other light-emitting elements described herein, including the light emitting-element 3064 of the articulating pusher shovel 3000. In some examples, the light-emitting element 4063 is configured to detachably coupled to the base structure 4071, for example, via a male/female coupling mechanism, wherein a male component, on one of the light-emitting element 4063 and the base structure 4071, is configured to engage with a female component on the other one of the light-emitting element 4063 and the base structure 4071. For example, the male/female coupling mechanism may include a dovetail coupling mechanism that includes a dovetail piece 4081 (e.g., a T-shaped dovetail piece) and a corresponding dovetail slot 4082 shaped and sized to receive at least part of the dovetail piece 4081. In some examples (e.g., the depicted example), the dovetail piece 4081 is on (e.g., forms part of) the light-emitting element 4064, and the dovetail slot 4082 is in the base structure 4071. In some other examples, the dovetail piece may instead by on (e.g., form part of) the base structure, and the dovetail slot may be in the light-emitting element. The dovetail coupling mechanism may be configured such that the dovetail slot is to be elongated along an axis non-parallel to, such as substantially perpendicular to (e.g., with about 10 degrees, about 5 degrees, about 3 degrees, or about 1 degree from being parallel), the ground plane during use so that the light-emitting element 4064 does not fall off from the base structure 4071.

In some examples, the head 4002 includes an elongated plate 4095 (e.g., a flat plate) that defines at least part of a bottom portion of the head 4002. The elongated plate 4095 may extend forwardly from a bottom edge of a rounded (e.g., semi-lunar shaped) portion of the head 4002 and may be attached to (e.g., integrally formed with) the rounded portion. The elongated plate 4095 may be configured to contact a ground plane, and to extend along a plane substantially parallel (e.g., within about 10 degrees, about 5 degrees, about 3 degrees, or about 1 degree from being parallel) with the ground plane, during use. The elongated plate 4095 may be configured to allow a larger volume of material (e.g., snow, sand, dirt, etc.) to accumulate on the head 4002.

The overflow resistant articulating pusher shovel may be substantially constructed of any suitable material or combination of materials, but typically is constructed of a resilient material or combination of materials such that the device is resistant to damage as a result of compression, twist, heating, or submersion in water. As an example, and without limiting the scope of the present disclosure, various embodiments of the overflow resistant articulating pusher shovel may be substantially constructed of one or more materials of steel, aluminum, brass, fiberglass, carbon fiber, plastic, acrylic, polycarbonate, polyester, nylon, denim, cotton, silicone, or combinations thereof. In some embodiments the various components of the device may be coated, lined, or otherwise insulated to prevent contamination of the device. In one or more embodiments the material of construction may vary from one component to the next within the system.

In one or more embodiments the overflow resistant articulating pusher shovel may include a resilient material of construction that either includes a material having antimicrobial properties or includes a layering of antimicrobial material or coating. Antimicrobial properties include the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the present disclosure has been described in connection with what is presently considered to be the most practical and preferred embodiments, it is to be understood that the present disclosure is not to be limited to the disclosed embodiments, but, on the contrary, is intended to cover various modifications and equivalent arrangements included within the spirit and scope of the appended claims, with functional equivalents thereof to be included therein.

The invention claimed is:

1. A pusher shovel, comprising:

a head;

an atlas attached to the head and comprising a first gear;

a shaft coupled to the atlas;

a handle that is rotatable relative to the shaft; and a driveshaft installed within the shaft, and coupled to the handle and to the first gear such that rotation of the handle causes the head to rotate relative to the shaft.

2. The pusher shovel of claim 1, further comprising a plurality of gears comprising the first gear, wherein the driveshaft interfaces with the plurality of gears such that the rotation of the handle causes the plurality of gears to turn.

3. The pusher shovel of claim 1, wherein the shaft has a proximal end, coupled to the atlas, and a distal end coupled to the handle.

4. A pusher shovel, comprising:

a head;

an atlas attached to the head;

a shaft rotatably coupled to the atlas;

a handle rotatably coupled to the shaft; and a twist mechanism configured to cause the head to rotate relative to the shaft in response to rotation of the handle, wherein the twist mechanism comprises a driveshaft installed in the shaft and coupled between the handle and the atlas.

5. The pusher shovel of claim 4, wherein the twist mechanism further comprises a plurality of gears coupled to the driveshaft and configured to turn in response to the rotation of the handle.

6. The pusher shovel of claim 5, wherein the plurality of gears comprises a first gear, rotatable about a first axis, and a second gear rotatable about a second axis that is non-parallel to the first axis.

7. The pusher shovel of claim 6, wherein the first gear is fixedly attached to the atlas, wherein the second gear is coupled between the first gear and the driveshaft.

8. The pusher shovel of claim 6, wherein the second axis forms an obtuse angle relative to the first axis.

9. The pusher shovel of claim 6, wherein the head has an elongated shape along a head axis, and the first axis is substantially perpendicular to the head axis.

10. The pusher shovel of claim 4, wherein the shaft extends along a shaft axis, wherein the head has an elongated shape along a head axis, and wherein an angle between the head axis and the shaft axis is adjustable via the twist mechanism.

11. The pusher shovel of claim 10, wherein the head comprises a rectangular shovel head having a semi-lunar cross-section perpendicular to the head axis.

12. The pusher shovel of claim 4, wherein the head is elongated between a first side end and a second side end along a head axis configured to be substantially parallel to a ground plane.

13. The pusher shovel of claim 12, wherein the shaft is coupled to the atlas at a proximal end, and wherein the rotation of the head relative to the shaft causes a first distance and a second distance, respectively between a distal end of the shaft and the first side end and between the distal end of the shaft and the second side end, to change.

14. The pusher shovel of claim 13, wherein the rotation of the head causes one of the first distance or the second distance to increase while the other one of the first distance or the second distance decreases.

15. The pusher shovel of claim 4, further comprising a light-emitting element configured to be coupled to the shaft.

16. The pusher shovel of claim 15, wherein the light-emitting element is configured to be detachably coupled to a housing fixed to the shaft.

17. The pusher shovel of claim 16, wherein the housing is adjacent to a proximal end of the shaft coupled to the atlas, and wherein the light-emitting element is configured to couple to the housing via a dovetail coupling mechanism, whereby a dovetail piece, on one of the light-emitting element and the housing, is configured to engage with a dovetail slot in the other one of the light-emitting element and the housing.

18. The pusher shovel of claim 16, wherein the housing has first and second bumper stops respectively configured to abut against the head or the atlas when the head rotates to first or second angular positions.

19. The pusher shovel of claim 16, wherein the light-emitting element comprises a light-emitting diode (LED).

* * * * *